US008719006B2

(12) United States Patent
Bellegarda

(10) Patent No.: US 8,719,006 B2
(45) Date of Patent: May 6, 2014

(54) COMBINED STATISTICAL AND RULE-BASED PART-OF-SPEECH TAGGING FOR TEXT-TO-SPEECH SYNTHESIS

(75) Inventor: Jerome R. Bellegarda, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 406 days.

(21) Appl. No.: 12/870,542

(22) Filed: Aug. 27, 2010

(65) Prior Publication Data

US 2012/0053946 A1 Mar. 1, 2012

(51) Int. Cl.
*G06F 17/27* (2006.01)
*G06F 17/20* (2006.01)
*G06F 17/21* (2006.01)

(52) U.S. Cl.
USPC .................................... 704/9; 704/1; 704/10

(58) Field of Classification Search
USPC .................................... 704/9, 258, 260, 266
See application file for complete search history.

(56) References Cited

U.S. PATENT DOCUMENTS

| | | | |
|---|---|---|---|
| 3,704,345 | A | 11/1972 | Coker et al. |
| 3,828,132 | A | 8/1974 | Flanagan et al. |
| 3,979,557 | A | 9/1976 | Schulman et al. |
| 4,278,838 | A | 7/1981 | Antonov |
| 4,282,405 | A | 8/1981 | Taguchi |
| 4,310,721 | A | 1/1982 | Manley et al. |
| 4,348,553 | A | 9/1982 | Baker et al. |
| 4,653,021 | A | 3/1987 | Takagi |
| 4,688,195 | A | 8/1987 | Thompson et al. |
| 4,692,941 | A | 9/1987 | Jacks et al. |
| 4,718,094 | A | 1/1988 | Bahl et al. |
| 4,724,542 | A | 2/1988 | Williford |
| 4,726,065 | A | 2/1988 | Froessl |
| 4,727,354 | A | 2/1988 | Lindsay |
| 4,776,016 | A | 10/1988 | Hansen |
| 4,783,807 | A | 11/1988 | Marley |
| 4,811,243 | A | 3/1989 | Racine |
| 4,819,271 | A | 4/1989 | Bahl et al. |
| 4,827,520 | A | 5/1989 | Zeinstra |
| 4,829,576 | A | 5/1989 | Porter |

(Continued)

FOREIGN PATENT DOCUMENTS

| | | | |
|---|---|---|---|
| CH | 681573 | A5 | 4/1993 |
| DE | 3837590 | A1 | 5/1990 |

(Continued)

OTHER PUBLICATIONS

Cheyer, A., "A Perspective on AI & Agent Technologies for SCM," VerticalNet, 2001 presentation, 22 pages.

(Continued)

*Primary Examiner* — Jesse Pullias
(74) *Attorney, Agent, or Firm* — Morrison & Foerster LLP

(57) ABSTRACT

In response to a word of a text sequence, a first part-of-speech (POS) tag is generated using a statistical part-of-speech (POS) tagger based on a corpus of trained text sequences, each representing a likely POS of a word for a given text sequence. A second POS tag is generated using a rule-based POS tagger based on a set of one or more rules associated with a type of an application associated with the text sequence. A final POS tag is assigned to the word of the text sequence for TTS synthesis based on the first POS tag and the second POS tag.

17 Claims, 4 Drawing Sheets

(56) References Cited

U.S. PATENT DOCUMENTS 4,833,712 A 5/1989 Bahl et al.
4,839,853 A 6/1989 Deerwester et al.
4,852,168 A 7/1989 Sprague
4,862,504 A 8/1989 Nomura
4,878,230 A 10/1989 Murakami et al.
4,903,305 A 2/1990 Gillick et al.
4,905,163 A 2/1990 Garber et al.
4,914,586 A 4/1990 Swinehart et al.
4,914,590 A 4/1990 Loatman et al.
4,944,013 A 7/1990 Gouvianakis et al.
4,955,047 A 9/1990 Morganstein et al.
4,965,763 A 10/1990 Zamora
4,974,191 A 11/1990 Amirghodsi et al.
4,977,598 A 12/1990 Doddington et al.
4,992,972 A 2/1991 Brooks et al.
5,010,574 A 4/1991 Wang
5,020,112 A 5/1991 Chou
5,021,971 A 6/1991 Lindsay
5,022,081 A 6/1991 Hirose et al.
5,027,406 A 6/1991 Roberts et al.
5,031,217 A 7/1991 Nishimura
5,032,989 A 7/1991 Tornetta
5,040,218 A 8/1991 Vitale et al.
5,047,617 A 9/1991 Bianco
5,057,915 A 10/1991 Kohorn et al.
5,072,452 A 12/1991 Brown et al.
5,091,945 A 2/1992 Kleijn
5,127,053 A 6/1992 Koch
5,127,055 A 6/1992 Larkey
5,128,672 A 7/1992 Kaehler
5,133,011 A 7/1992 McKiel, Jr.
5,142,584 A 8/1992 Ozawa
5,164,900 A 11/1992 Bernath
5,165,007 A 11/1992 Bahl et al.
5,179,652 A 1/1993 Rozmanith et al.
5,194,950 A 3/1993 Murakami et al.
5,197,005 A 3/1993 Shwartz et al.
5,199,077 A 3/1993 Wilcox et al.
5,202,952 A 4/1993 Gillick et al.
5,208,862 A 5/1993 Ozawa
5,216,747 A 6/1993 Hardwick et al.
5,220,639 A 6/1993 Lee
5,220,657 A 6/1993 Bly et al.
5,222,146 A 6/1993 Bahl et al.
5,230,036 A 7/1993 Akamine et al.
5,235,680 A 8/1993 Bijnagte
5,267,345 A 11/1993 Brown et al.
5,268,990 A 12/1993 Cohen et al.
5,282,265 A 1/1994 Rohra Suda et al.
RE34,562 E 3/1994 Murakami et al.
5,291,286 A 3/1994 Murakami et al.
5,293,448 A 3/1994 Honda
5,293,452 A 3/1994 Picone et al.
5,297,170 A 3/1994 Eyuboglu et al.
5,301,109 A 4/1994 Landauer et al.
5,303,406 A 4/1994 Hansen et al.
5,309,359 A 5/1994 Katz et al.
5,317,507 A 5/1994 Gallant
5,317,647 A 5/1994 Pagallo
5,325,297 A 6/1994 Bird et al.
5,325,298 A 6/1994 Gallant
5,327,498 A 7/1994 Hamon
5,333,236 A 7/1994 Bahl et al.
5,333,275 A 7/1994 Wheatley et al.
5,345,536 A 9/1994 Hoshimi et al.
5,349,645 A 9/1994 Zhao
5,353,377 A 10/1994 Kuroda et al.
5,377,301 A 12/1994 Rosenberg et al.
5,384,892 A 1/1995 Strong
5,384,893 A 1/1995 Hutchins
5,386,494 A 1/1995 White
5,386,556 A 1/1995 Hedin et al.
5,390,279 A 2/1995 Strong
5,396,625 A 3/1995 Parkes
5,400,434 A 3/1995 Pearson
5,404,295 A 4/1995 Katz et al.
5,412,756 A 5/1995 Bauman et al.
5,412,804 A 5/1995 Krishna
5,412,806 A 5/1995 Du et al.
5,418,951 A 5/1995 Damashek
5,424,947 A 6/1995 Nagao et al.
5,434,777 A 7/1995 Luciw
5,444,823 A 8/1995 Nguyen
5,455,888 A 10/1995 Iyengar et al.
5,469,529 A 11/1995 Bimbot et al.
5,471,611 A 11/1995 McGregor
5,475,587 A 12/1995 Anick et al.
5,479,488 A 12/1995 Lenning et al.
5,491,772 A 2/1996 Hardwick et al.
5,493,677 A 2/1996 Balogh
5,495,604 A 2/1996 Harding et al.
5,502,790 A 3/1996 Yi
5,502,791 A 3/1996 Nishimura et al.
5,515,475 A 5/1996 Gupta et al.
5,536,902 A 7/1996 Serra et al.
5,537,618 A 7/1996 Boulton et al.
5,574,823 A 11/1996 Hassanein et al.
5,577,241 A 11/1996 Spencer
5,578,808 A 11/1996 Taylor
5,579,436 A 11/1996 Chou et al.
5,581,655 A 12/1996 Cohen et al.
5,584,024 A 12/1996 Shwartz
5,596,676 A 1/1997 Swaminathan et al.
5,596,994 A 1/1997 Bro
5,608,624 A 3/1997 Luciw
5,610,812 A * 3/1997 Schabes et al. .................. 704/9
5,613,036 A 3/1997 Strong
5,617,507 A 4/1997 Lee et al.
5,619,694 A 4/1997 Shimazu
5,621,859 A 4/1997 Schwartz et al.
5,621,903 A 4/1997 Luciw et al.
5,642,464 A 6/1997 Yue et al.
5,642,519 A 6/1997 Martin
5,644,727 A 7/1997 Atkins
5,664,055 A 9/1997 Kroon
5,675,819 A 10/1997 Schuetze
5,682,539 A 10/1997 Conrad et al.
5,687,077 A 11/1997 Gough, Jr.
5,696,962 A 12/1997 Kupiec
5,701,400 A 12/1997 Amado
5,706,442 A 1/1998 Anderson et al.
5,710,886 A 1/1998 Christensen et al.
5,712,957 A 1/1998 Waibel et al.
5,715,468 A 2/1998 Budzinski
5,721,827 A 2/1998 Logan et al.
5,727,950 A 3/1998 Cook et al.
5,729,694 A 3/1998 Holzrichter et al.
5,732,390 A 3/1998 Katayanagi et al.
5,734,791 A 3/1998 Acero et al.
5,737,734 A 4/1998 Schultz
5,748,974 A 5/1998 Johnson
5,749,081 A 5/1998 Whiteis
5,759,101 A 6/1998 Von Kohorn
5,790,978 A 8/1998 Olive et al.
5,794,050 A 8/1998 Dahlgren et al.
5,794,182 A 8/1998 Manduchi et al.
5,794,207 A 8/1998 Walker et al.
5,794,237 A 8/1998 Gore, Jr.
5,799,276 A 8/1998 Komissarchik et al.
5,822,743 A 10/1998 Gupta et al.
5,825,881 A 10/1998 Colvin, Sr.
5,826,261 A 10/1998 Spencer
5,828,999 A 10/1998 Bellegarda et al.
5,835,893 A 11/1998 Ushioda
5,839,106 A 11/1998 Bellegarda
5,845,255 A 12/1998 Mayaud
5,857,184 A 1/1999 Lynch
5,860,063 A 1/1999 Gorin et al.
5,862,233 A 1/1999 Walker et al.
5,864,806 A 1/1999 Mokbel et al.
5,864,844 A 1/1999 James et al.
5,867,799 A 2/1999 Lang et al.
5,873,056 A 2/1999 Liddy et al.
5,875,437 A 2/1999 Atkins

(56) References Cited

U.S. PATENT DOCUMENTS

| | | | |
|---|---|---|---|
| 5,884,323 | A | 3/1999 | Hawkins et al. |
| 5,895,464 | A | 4/1999 | Bhandari et al. |
| 5,895,466 | A | 4/1999 | Goldberg et al. |
| 5,899,972 | A | 5/1999 | Miyazawa et al. |
| 5,913,193 | A | 6/1999 | Huang et al. |
| 5,915,249 | A | 6/1999 | Spencer |
| 5,930,769 | A | 7/1999 | Rose |
| 5,933,822 | A | 8/1999 | Braden-Harder et al. |
| 5,936,926 | A | 8/1999 | Yokouchi et al. |
| 5,940,811 | A | 8/1999 | Norris |
| 5,941,944 | A | 8/1999 | Messerly |
| 5,943,670 | A | 8/1999 | Prager |
| 5,948,040 | A | 9/1999 | DeLorme et al. |
| 5,956,699 | A | 9/1999 | Wong et al. |
| 5,960,422 | A | 9/1999 | Prasad |
| 5,963,924 | A | 10/1999 | Williams et al. |
| 5,966,126 | A | 10/1999 | Szabo |
| 5,970,474 | A | 10/1999 | LeRoy et al. |
| 5,974,146 | A | 10/1999 | Randle et al. |
| 5,982,891 | A | 11/1999 | Ginter et al. |
| 5,987,132 | A | 11/1999 | Rowney |
| 5,987,140 | A | 11/1999 | Rowney et al. |
| 5,987,404 | A | 11/1999 | Della Pietra et al. |
| 5,987,440 | A | 11/1999 | O'Neil et al. |
| 5,999,908 | A | 12/1999 | Abelow |
| 6,016,471 | A | 1/2000 | Kuhn et al. |
| 6,023,684 | A | 2/2000 | Pearson |
| 6,024,288 | A | 2/2000 | Gottlich et al. |
| 6,026,345 | A | 2/2000 | Shah et al. |
| 6,026,375 | A | 2/2000 | Hall et al. |
| 6,026,388 | A | 2/2000 | Liddy et al. |
| 6,026,393 | A | 2/2000 | Gupta et al. |
| 6,029,132 | A | 2/2000 | Kuhn et al. |
| 6,038,533 | A | 3/2000 | Buchsbaum et al. |
| 6,052,656 | A | 4/2000 | Suda et al. |
| 6,055,514 | A | 4/2000 | Wren |
| 6,055,531 | A | 4/2000 | Bennett et al. |
| 6,064,960 | A | 5/2000 | Bellegarda et al. |
| 6,070,139 | A | 5/2000 | Miyazawa et al. |
| 6,070,147 | A | 5/2000 | Harms et al. |
| 6,076,051 | A | 6/2000 | Messerly et al. |
| 6,076,088 | A | 6/2000 | Paik et al. |
| 6,078,914 | A | 6/2000 | Redfern |
| 6,081,750 | A | 6/2000 | Hoffberg et al. |
| 6,081,774 | A | 6/2000 | de Hita et al. |
| 6,088,731 | A | 7/2000 | Kiraly et al. |
| 6,094,649 | A | 7/2000 | Bowen et al. |
| 6,105,865 | A | 8/2000 | Hardesty |
| 6,108,627 | A | 8/2000 | Sabourin |
| 6,119,101 | A | 9/2000 | Peckover |
| 6,122,616 | A | 9/2000 | Henton |
| 6,125,356 | A | 9/2000 | Brockman et al. |
| 6,144,938 | A | 11/2000 | Surace et al. |
| 6,173,261 | B1 | 1/2001 | Arai et al. |
| 6,173,279 | B1 | 1/2001 | Levin et al. |
| 6,182,028 | B1 | 1/2001 | Karaali et al. |
| 6,188,999 | B1 | 2/2001 | Moody |
| 6,195,641 | B1 | 2/2001 | Loring et al. |
| 6,205,456 | B1 | 3/2001 | Nakao |
| 6,208,971 | B1 | 3/2001 | Bellegarda et al. |
| 6,233,559 | B1 | 5/2001 | Balakrishnan |
| 6,233,578 | B1 | 5/2001 | Machihara et al. |
| 6,246,981 | B1 | 6/2001 | Papineni et al. |
| 6,260,024 | B1 | 7/2001 | Shkedy |
| 6,266,637 | B1 | 7/2001 | Donovan et al. |
| 6,275,824 | B1 | 8/2001 | O'Flaherty et al. |
| 6,285,786 | B1 | 9/2001 | Seni et al. |
| 6,308,149 | B1 | 10/2001 | Gaussier et al. |
| 6,311,189 | B1 | 10/2001 | deVries et al. |
| 6,317,594 | B1 | 11/2001 | Gossman et al. |
| 6,317,707 | B1 | 11/2001 | Bangalore et al. |
| 6,317,831 | B1 | 11/2001 | King |
| 6,321,092 | B1 | 11/2001 | Fitch et al. |
| 6,334,103 | B1 | 12/2001 | Surace et al. |
| 6,356,854 | B1 | 3/2002 | Schubert et al. |
| 6,356,905 | B1 | 3/2002 | Gershman et al. |
| 6,366,883 | B1 | 4/2002 | Campbell et al. |
| 6,366,884 | B1 | 4/2002 | Bellegarda et al. |
| 6,421,672 | B1 | 7/2002 | McAllister et al. |
| 6,434,524 | B1 | 8/2002 | Weber |
| 6,446,076 | B1 | 9/2002 | Burkey et al. |
| 6,449,620 | B1 | 9/2002 | Draper et al. |
| 6,453,292 | B2 | 9/2002 | Ramaswamy et al. |
| 6,460,029 | B1 | 10/2002 | Fries et al. |
| 6,466,654 | B1 | 10/2002 | Cooper et al. |
| 6,477,488 | B1 | 11/2002 | Bellegarda |
| 6,487,534 | B1 | 11/2002 | Thelen et al. |
| 6,499,013 | B1 | 12/2002 | Weber |
| 6,501,937 | B1 | 12/2002 | Ho et al. |
| 6,505,158 | B1 | 1/2003 | Conkie |
| 6,505,175 | B1 | 1/2003 | Silverman et al. |
| 6,505,183 | B1 | 1/2003 | Loofbourrow et al. |
| 6,510,417 | B1 | 1/2003 | Woods et al. |
| 6,513,063 | B1 | 1/2003 | Julia et al. |
| 6,523,061 | B1 | 2/2003 | Halverson et al. |
| 6,523,172 | B1 | 2/2003 | Martinez-Guerra et al. |
| 6,526,382 | B1 | 2/2003 | Yuschik |
| 6,526,395 | B1 | 2/2003 | Morris |
| 6,532,444 | B1 | 3/2003 | Weber |
| 6,532,446 | B1 | 3/2003 | King |
| 6,546,388 | B1 | 4/2003 | Edlund et al. |
| 6,553,344 | B2 | 4/2003 | Bellegarda et al. |
| 6,556,983 | B1 | 4/2003 | Altschuler et al. |
| 6,584,464 | B1 | 6/2003 | Warthen |
| 6,598,039 | B1 | 7/2003 | Livowsky |
| 6,601,026 | B2 | 7/2003 | Appelt et al. |
| 6,601,234 | B1 | 7/2003 | Bowman-Amuah |
| 6,604,059 | B2 | 8/2003 | Strubbe et al. |
| 6,615,172 | B1 | 9/2003 | Bennett et al. |
| 6,615,175 | B1 | 9/2003 | Gazdzinski |
| 6,615,220 | B1 | 9/2003 | Austin et al. |
| 6,625,583 | B1 | 9/2003 | Silverman et al. |
| 6,631,346 | B1 | 10/2003 | Karaorman et al. |
| 6,633,846 | B1 | 10/2003 | Bennett et al. |
| 6,647,260 | B2 | 11/2003 | Dusse et al. |
| 6,650,735 | B2 | 11/2003 | Burton et al. |
| 6,654,740 | B2 | 11/2003 | Tokuda et al. |
| 6,665,639 | B2 | 12/2003 | Mozer et al. |
| 6,665,640 | B1 | 12/2003 | Bennett et al. |
| 6,665,641 | B1 | 12/2003 | Coorman et al. |
| 6,684,187 | B1 | 1/2004 | Conkie |
| 6,691,064 | B2 | 2/2004 | Vroman |
| 6,691,111 | B2 | 2/2004 | Lazaridis et al. |
| 6,691,151 | B1 | 2/2004 | Cheyer et al. |
| 6,697,780 | B1 | 2/2004 | Beutnagel et al. |
| 6,697,824 | B1 | 2/2004 | Bowman-Amuah |
| 6,701,294 | B1 | 3/2004 | Ball et al. |
| 6,711,585 | B1 | 3/2004 | Copperman et al. |
| 6,718,324 | B2 | 4/2004 | Edlund et al. |
| 6,721,728 | B2 | 4/2004 | McGreevy |
| 6,735,632 | B1 | 5/2004 | Kiraly et al. |
| 6,742,021 | B1 | 5/2004 | Halverson et al. |
| 6,757,362 | B1 | 6/2004 | Cooper et al. |
| 6,757,718 | B1 | 6/2004 | Halverson et al. |
| 6,766,320 | B1 | 7/2004 | Want et al. |
| 6,778,951 | B1 | 8/2004 | Contractor |
| 6,778,952 | B2 | 8/2004 | Bellegarda |
| 6,778,962 | B1 | 8/2004 | Kasai et al. |
| 6,778,970 | B2 | 8/2004 | Au |
| 6,792,082 | B1 | 9/2004 | Levine |
| 6,807,574 | B1 | 10/2004 | Partovi et al. |
| 6,810,379 | B1 | 10/2004 | Vermeulen et al. |
| 6,813,491 | B1 | 11/2004 | McKinney |
| 6,829,603 | B1 | 12/2004 | Chai et al. |
| 6,832,194 | B1 | 12/2004 | Mozer et al. |
| 6,842,767 | B1 | 1/2005 | Partovi et al. |
| 6,847,966 | B1 | 1/2005 | Sommer et al. |
| 6,847,979 | B2 | 1/2005 | Allemang et al. |
| 6,851,115 | B1 | 2/2005 | Cheyer et al. |
| 6,859,931 | B1 | 2/2005 | Cheyer et al. |
| 6,895,380 | B2 | 5/2005 | Sepe, Jr. |
| 6,895,558 | B1 | 5/2005 | Loveland |
| 6,901,399 | B1 | 5/2005 | Corston et al. |
| 6,912,499 | B1 | 6/2005 | Sabourin et al. |

(56) References Cited

U.S. PATENT DOCUMENTS 6,924,828 B1 8/2005 Hirsch
6,928,614 B1 8/2005 Everhart
6,931,384 B1 8/2005 Horvitz et al.
6,937,975 B1 8/2005 Elworthy
6,937,986 B2 8/2005 Denenberg et al.
6,964,023 B2 11/2005 Maes et al.
6,980,949 B2 12/2005 Ford
6,980,955 B2 12/2005 Okutani et al.
6,985,865 B1 1/2006 Packingham et al.
6,988,071 B1 1/2006 Gazdzinski
6,996,531 B2 2/2006 Korall et al.
6,999,927 B2 2/2006 Mozer et al.
7,020,685 B1 3/2006 Chen et al.
7,027,974 B1 4/2006 Busch et al.
7,036,128 B1 4/2006 Julia et al.
7,050,977 B1 5/2006 Bennett
7,058,569 B2 6/2006 Coorman et al.
7,062,428 B2 6/2006 Hogenhout et al.
7,069,560 B1 6/2006 Cheyer et al.
7,092,887 B2 8/2006 Mozer et al.
7,092,928 B1 8/2006 Elad et al.
7,093,693 B1 8/2006 Gazdzinski
7,127,046 B1 10/2006 Smith et al.
7,127,403 B1 10/2006 Saylor et al.
7,136,710 B1 11/2006 Hoffberg et al.
7,137,126 B1 11/2006 Coffman et al.
7,139,714 B2 11/2006 Bennett et al.
7,139,722 B2 11/2006 Perrella et al.
7,152,070 B1 12/2006 Musick et al.
7,177,798 B2 2/2007 Hsu et al.
7,197,460 B1 3/2007 Gupta et al.
7,200,559 B2 4/2007 Wang
7,203,646 B2 4/2007 Bennett
7,216,073 B2 5/2007 Lavi et al.
7,216,080 B2 5/2007 Tsiao et al.
7,225,125 B2 5/2007 Bennett et al.
7,233,790 B2 6/2007 Kjellberg et al.
7,233,904 B2 6/2007 Luisi
7,266,496 B2 9/2007 Wang et al.
7,269,544 B2 9/2007 Simske
7,277,854 B2 10/2007 Bennett et al.
7,290,039 B1 10/2007 Lisitsa et al.
7,299,033 B2 11/2007 Kjellberg et al.
7,310,600 B1 12/2007 Garner et al.
7,324,947 B2 1/2008 Jordan et al.
7,349,953 B2 3/2008 Lisitsa et al.
7,376,556 B2 5/2008 Bennett
7,376,645 B2 5/2008 Bernard
7,379,874 B2 5/2008 Schmid et al.
7,386,449 B2 6/2008 Sun et al.
7,389,224 B1 6/2008 Elworthy
7,392,185 B2 6/2008 Bennett
7,398,209 B2 7/2008 Kennewick et al.
7,403,938 B2 7/2008 Harrison et al.
7,409,337 B1 8/2008 Potter et al.
7,415,100 B2 8/2008 Cooper et al.
7,418,392 B1 8/2008 Mozer et al.
7,426,467 B2 9/2008 Nashida et al.
7,427,024 B1 9/2008 Gazdzinski et al.
7,447,635 B1 11/2008 Konopka et al.
7,454,351 B2 11/2008 Jeschke et al.
7,467,087 B1 12/2008 Gillick et al.
7,475,010 B2 1/2009 Chao
7,483,894 B2 1/2009 Cao
7,487,089 B2 2/2009 Mozer
7,496,498 B2 2/2009 Chu et al.
7,496,512 B2 2/2009 Zhao et al.
7,502,738 B2 3/2009 Kennewick et al.
7,508,373 B2 3/2009 Lin et al.
7,522,927 B2 4/2009 Fitch et al.
7,523,108 B2 4/2009 Cao
7,526,466 B2 4/2009 Au
7,529,671 B2 5/2009 Rockenbeck et al.
7,529,676 B2 5/2009 Koyama
7,539,656 B2 5/2009 Fratkina et al.
7,546,382 B2 6/2009 Healey et al.
7,548,895 B2 6/2009 Pulsipher
7,552,055 B2 6/2009 Lecoeuche
7,555,431 B2 6/2009 Bennett
7,558,730 B2 7/2009 Davis et al.
7,571,106 B2 8/2009 Cao et al.
7,599,918 B2 10/2009 Shen et al.
7,620,549 B2 11/2009 Di Cristo et al.
7,624,007 B2 11/2009 Bennett
7,634,409 B2 12/2009 Kennewick et al.
7,636,657 B2 12/2009 Ju et al.
7,640,160 B2 12/2009 Di Cristo et al.
7,647,225 B2 1/2010 Bennett et al.
7,657,424 B2 2/2010 Bennett
7,672,841 B2 3/2010 Bennett
7,676,026 B1 3/2010 Baxter, Jr.
7,684,985 B2 3/2010 Dominach et al.
7,693,715 B2 4/2010 Hwang et al.
7,693,720 B2 4/2010 Kennewick et al.
7,698,131 B2 4/2010 Bennett
7,702,500 B2 4/2010 Blaedow
7,702,508 B2 4/2010 Bennett
7,707,027 B2 4/2010 Balchandran et al.
7,707,032 B2 4/2010 Wang et al.
7,707,267 B2 4/2010 Lisitsa et al.
7,711,565 B1 5/2010 Gazdzinski
7,711,672 B2 5/2010 Au
7,716,056 B2 5/2010 Weng et al.
7,720,674 B2 5/2010 Kaiser et al.
7,720,683 B1 5/2010 Vermeulen et al.
7,725,307 B2 5/2010 Bennett
7,725,318 B2 5/2010 Gavalda et al.
7,725,320 B2 5/2010 Bennett
7,725,321 B2 5/2010 Bennett
7,729,904 B2 6/2010 Bennett
7,729,916 B2 6/2010 Coffman et al.
7,734,461 B2 6/2010 Kwak et al.
7,747,616 B2 6/2010 Yamada et al.
7,752,152 B2 7/2010 Paek et al.
7,756,868 B2 7/2010 Lee
7,774,204 B2 8/2010 Mozer et al.
7,783,486 B2 8/2010 Rosser et al.
7,801,729 B2 9/2010 Mozer
7,809,570 B2 10/2010 Kennewick et al.
7,809,610 B2 10/2010 Cao
7,818,176 B2 10/2010 Freeman et al.
7,822,608 B2 10/2010 Cross, Jr. et al.
7,826,945 B2 11/2010 Zhang et al.
7,831,426 B2 11/2010 Bennett
7,840,400 B2 11/2010 Lavi et al.
7,840,447 B2 11/2010 Kleinrock et al.
7,853,445 B2 * 12/2010 Bachenko et al. ................ 704/9
7,853,574 B2 12/2010 Kraenzel et al.
7,873,519 B2 1/2011 Bennett
7,873,654 B2 1/2011 Bernard
7,881,936 B2 2/2011 Longé et al.
7,890,652 B2 2/2011 Bull et al.
7,912,702 B2 3/2011 Bennett
7,917,367 B2 3/2011 Di Cristo et al.
7,917,497 B2 3/2011 Harrison et al.
7,920,678 B2 4/2011 Cooper et al.
7,925,525 B2 4/2011 Chin
7,930,168 B2 4/2011 Weng et al.
7,949,529 B2 5/2011 Weider et al.
7,949,534 B2 5/2011 Davis et al.
7,974,844 B2 7/2011 Sumita
7,974,972 B2 7/2011 Cao
7,983,915 B2 7/2011 Knight et al.
7,983,917 B2 7/2011 Kennewick et al.
7,983,997 B2 7/2011 Allen et al.
7,986,431 B2 7/2011 Emori et al.
7,987,151 B2 7/2011 Schott et al.
7,996,228 B2 8/2011 Miller et al.
8,000,453 B2 8/2011 Cooper et al.
8,005,679 B2 8/2011 Jordan et al.
8,015,006 B2 9/2011 Kennewick et al.
8,024,195 B2 9/2011 Mozer et al.
8,036,901 B2 10/2011 Mozer
8,041,570 B2 10/2011 Mirkovic et al.

(56) References Cited

U.S. PATENT DOCUMENTS 8,041,611 B2 10/2011 Kleinrock et al.
8,055,708 B2 11/2011 Chitsaz et al.
8,065,155 B1 11/2011 Gazdzinski
8,065,156 B2 11/2011 Gazdzinski
8,069,046 B2 11/2011 Kennewick et al.
8,073,681 B2 12/2011 Baldwin et al.
8,078,473 B1 12/2011 Gazdzinski
8,082,153 B2 12/2011 Coffman et al.
8,095,364 B2 1/2012 Longé et al.
8,099,289 B2 1/2012 Mozer et al.
8,107,401 B2 1/2012 John et al.
8,112,275 B2 2/2012 Kennewick et al.
8,112,280 B2 2/2012 Lu
8,117,037 B2 2/2012 Gazdzinski
8,131,557 B2 3/2012 Davis et al.
8,140,335 B2 3/2012 Kennewick et al.
8,165,886 B1 4/2012 Gagnon et al.
8,166,019 B1 4/2012 Lee et al.
8,190,359 B2 5/2012 Bourne
8,195,467 B2 6/2012 Mozer et al.
8,204,238 B2 6/2012 Mozer
8,205,788 B1 6/2012 Gazdzinski et al.
8,219,407 B1 7/2012 Roy et al.
8,285,551 B2 10/2012 Gazdzinski
8,285,553 B2 10/2012 Gazdzinski
8,290,778 B2 10/2012 Gazdzinski
8,290,781 B2 10/2012 Gazdzinski
8,296,146 B2 10/2012 Gazdzinski
8,296,153 B2 10/2012 Gazdzinski
8,301,456 B2 10/2012 Gazdzinski
8,311,834 B1 11/2012 Gazdzinski
8,370,158 B2 2/2013 Gazdzinski
8,371,503 B2 2/2013 Gazdzinski
8,374,871 B2 2/2013 Ehsani et al.
8,447,612 B2 5/2013 Gazdzinski
2001/0047264 A1 11/2001 Roundtree
2002/0032564 A1 3/2002 Ehsani et al.
2002/0046025 A1 4/2002 Hain
2002/0069063 A1 6/2002 Buchner et al.
2002/0077817 A1 6/2002 Atal
2002/0103641 A1 8/2002 Kuo et al.
2002/0164000 A1 11/2002 Cohen et al.
2002/0198714 A1 12/2002 Zhou
2003/0191645 A1 10/2003 Zhou
2004/0135701 A1 7/2004 Yasuda et al.
2004/0236778 A1 11/2004 Junqua et al.
2005/0055403 A1 3/2005 Brittan
2005/0071332 A1 3/2005 Ortega et al.
2005/0080613 A1 4/2005 Colledge et al.
2005/0080625 A1 4/2005 Bennett et al.
2005/0091118 A1 4/2005 Fano
2005/0102614 A1 5/2005 Brockett et al.
2005/0108001 A1 5/2005 Aarskog
2005/0114124 A1 5/2005 Liu et al.
2005/0119897 A1 6/2005 Bennett et al.
2005/0143972 A1 6/2005 Gopalakrishnan et al.
2005/0165607 A1 7/2005 DiFabbrizio et al.
2005/0182629 A1 8/2005 Coorman et al.
2005/0196733 A1 9/2005 Budra et al.
2005/0288936 A1 12/2005 Busayapongchai et al.
2006/0018492 A1 1/2006 Chiu et al.
2006/0041424 A1* 2/2006 Todhunter et al. ................ 704/9
2006/0106592 A1 5/2006 Brockett et al.
2006/0106594 A1 5/2006 Brockett et al.
2006/0106595 A1 5/2006 Brockett et al.
2006/0117002 A1 6/2006 Swen
2006/0122834 A1 6/2006 Bennett
2006/0143007 A1 6/2006 Koh et al.
2007/0055529 A1 3/2007 Kanevsky et al.
2007/0058832 A1 3/2007 Hug et al.
2007/0088556 A1 4/2007 Andrew
2007/0100790 A1 5/2007 Cheyer et al.
2007/0106674 A1 5/2007 Agrawal et al.
2007/0118377 A1 5/2007 Badino et al.
2007/0135949 A1 6/2007 Snover et al.
2007/0174188 A1 7/2007 Fish
2007/0185917 A1 8/2007 Prahlad et al.
2007/0282595 A1 12/2007 Tunning et al.
2008/0015864 A1 1/2008 Ross et al.
2008/0021708 A1 1/2008 Bennett et al.
2008/0034032 A1 2/2008 Healey et al.
2008/0052063 A1 2/2008 Bennett et al.
2008/0120112 A1 5/2008 Jordan et al.
2008/0129520 A1 6/2008 Lee
2008/0140657 A1 6/2008 Azvine et al.
2008/0221903 A1 9/2008 Kanevsky et al.
2008/0228496 A1 9/2008 Yu et al.
2008/0247519 A1 10/2008 Abella et al.
2008/0249770 A1 10/2008 Kim et al.
2008/0300878 A1 12/2008 Bennett
2008/0319763 A1 12/2008 Di Fabbrizio et al.
2009/0006100 A1 1/2009 Badger et al.
2009/0006343 A1 1/2009 Platt et al.
2009/0030800 A1 1/2009 Grois
2009/0055179 A1 2/2009 Cho et al.
2009/0058823 A1 3/2009 Kocienda
2009/0076796 A1 3/2009 Daraselia
2009/0077165 A1 3/2009 Rhodes et al.
2009/0100049 A1 4/2009 Cao
2009/0112677 A1 4/2009 Rhett
2009/0150156 A1 6/2009 Kennewick et al.
2009/0157384 A1* 6/2009 Toutanova et al. ................ 704/9
2009/0157401 A1 6/2009 Bennett
2009/0164441 A1 6/2009 Cheyer
2009/0171664 A1 7/2009 Kennewick et al.
2009/0287583 A1 11/2009 Holmes
2009/0290718 A1 11/2009 Kahn et al.
2009/0299745 A1 12/2009 Kennewick et al.
2009/0299849 A1 12/2009 Cao et al.
2009/0307162 A1 12/2009 Bui et al.
2010/0005081 A1 1/2010 Bennett
2010/0023320 A1 1/2010 Di Cristo et al.
2010/0036660 A1 2/2010 Bennett
2010/0042400 A1 2/2010 Block et al.
2010/0088020 A1 4/2010 Sano et al.
2010/0138215 A1 6/2010 Williams
2010/0145700 A1 6/2010 Kennewick et al.
2010/0161313 A1* 6/2010 Karttunen ......................... 704/9
2010/0204986 A1 8/2010 Kennewick et al.
2010/0217604 A1 8/2010 Baldwin et al.
2010/0228540 A1 9/2010 Bennett
2010/0235341 A1 9/2010 Bennett
2010/0257160 A1 10/2010 Cao
2010/0262599 A1 10/2010 Nitz
2010/0277579 A1 11/2010 Cho et al.
2010/0280983 A1 11/2010 Cho et al.
2010/0286985 A1 11/2010 Kennewick et al.
2010/0299142 A1 11/2010 Freeman et al.
2010/0312547 A1 12/2010 Van Os et al.
2010/0318576 A1 12/2010 Kim
2010/0332235 A1 12/2010 David
2010/0332348 A1 12/2010 Cao
2011/0047072 A1 2/2011 Ciurea
2011/0060807 A1 3/2011 Martin et al.
2011/0082688 A1 4/2011 Kim et al.
2011/0112827 A1 5/2011 Kennewick et al.
2011/0112921 A1 5/2011 Kennewick et al.
2011/0119049 A1 5/2011 Ylonen
2011/0125540 A1 5/2011 Jang et al.
2011/0130958 A1 6/2011 Stahl et al.
2011/0131036 A1 6/2011 Di Cristo et al.
2011/0131045 A1 6/2011 Cristo et al.
2011/0143811 A1 6/2011 Rodriguez
2011/0144999 A1 6/2011 Jang et al.
2011/0161076 A1 6/2011 Davis et al.
2011/0161309 A1 6/2011 Lung et al.
2011/0175810 A1 7/2011 Markovic et al.
2011/0184730 A1 7/2011 LeBeau et al.
2011/0218855 A1 9/2011 Cao et al.
2011/0231182 A1 9/2011 Weider et al.
2011/0231188 A1 9/2011 Kennewick et al.
2011/0264643 A1 10/2011 Cao
2011/0279368 A1 11/2011 Klein et al.
2011/0306426 A1 12/2011 Novak et al.

(56) References Cited

U.S. PATENT DOCUMENTS

| | | | |
|---|---|---|---|
| 2012/0002820 | A1 | 1/2012 | Leichter |
| 2012/0016678 | A1 | 1/2012 | Gruber et al. |
| 2012/0020490 | A1 | 1/2012 | Leichter |
| 2012/0022787 | A1 | 1/2012 | LeBeau et al. |
| 2012/0022857 | A1 | 1/2012 | Baldwin et al. |
| 2012/0022860 | A1 | 1/2012 | Lloyd et al. |
| 2012/0022868 | A1 | 1/2012 | LeBeau et al. |
| 2012/0022869 | A1 | 1/2012 | Lloyd et al. |
| 2012/0022870 | A1 | 1/2012 | Kristjansson et al. |
| 2012/0022874 | A1 | 1/2012 | Lloyd et al. |
| 2012/0022876 | A1 | 1/2012 | Lebeau et al. |
| 2012/0023088 | A1 | 1/2012 | Cheng et al. |
| 2012/0034904 | A1 | 2/2012 | LeBeau et al. |
| 2012/0035908 | A1 | 2/2012 | LeBeau et al. |
| 2012/0035924 | A1 | 2/2012 | Jitkoff et al. |
| 2012/0035931 | A1 | 2/2012 | LeBeau et al. |
| 2012/0035932 | A1 | 2/2012 | Jitkoff et al. |
| 2012/0042343 | A1 | 2/2012 | Laligand et al. |
| 2012/0137367 | A1 | 5/2012 | Dupont et al. |
| 2012/0173464 | A1 | 7/2012 | Tur et al. |
| 2012/0265528 | A1 | 10/2012 | Gruber et al. |
| 2012/0271676 | A1 | 10/2012 | Aravamudan et al. |
| 2012/0311583 | A1 | 12/2012 | Gruber et al. |
| 2013/0110518 | A1 | 5/2013 | Gruber et al. |
| 2013/0110520 | A1 | 5/2013 | Cheyer et al. |

FOREIGN PATENT DOCUMENTS

| | | | |
|---|---|---|---|
| DE | 198 41 541 | B4 | 12/2007 |
| EP | 0138061 | B1 | 9/1984 |
| EP | 0138061 | A1 | 4/1985 |
| EP | 0218859 | A2 | 4/1987 |
| EP | 0262938 | A1 | 4/1988 |
| EP | 0293259 | A2 | 11/1988 |
| EP | 0299572 | A2 | 1/1989 |
| EP | 0313975 | A2 | 5/1989 |
| EP | 0314908 | A2 | 5/1989 |
| EP | 0327408 | A2 | 8/1989 |
| EP | 0389271 | A2 | 9/1990 |
| EP | 0411675 | A2 | 2/1991 |
| EP | 0559349 | A1 | 9/1993 |
| EP | 0559349 | B1 | 9/1993 |
| EP | 0570660 | A1 | 11/1993 |
| EP | 0863453 | A1 | 9/1998 |
| EP | 1245023 | A1 | 10/2002 |
| EP | 2 109 295 | A1 | 10/2009 |
| GB | 2293667 | A | 4/1996 |
| JP | 06 019965 | | 1/1994 |
| JP | 2001 125896 | | 5/2001 |
| JP | 2002 024212 | | 1/2002 |
| JP | 2003517158 | A | 5/2003 |
| JP | 2009 036999 | | 2/2009 |
| KR | 10-2007-0057496 | | 6/2007 |
| KR | 10-0776800 | B1 | 11/2007 |
| KR | 10-2008-001227 | | 2/2008 |
| KR | 10-0810500 | B1 | 3/2008 |
| KR | 10 2008 109322 | A | 12/2008 |
| KR | 10 2009 086805 | A | 8/2009 |
| KR | 10-0920267 | B1 | 10/2009 |
| KR | 10-2010-0032792 | | 4/2010 |
| KR | 10 2011 0113414 | A | 10/2011 |
| WO | WO 95/02221 | | 1/1995 |
| WO | WO 97/26612 | | 7/1997 |
| WO | WO 98/41956 | | 9/1998 |
| WO | WO 99/01834 | | 1/1999 |
| WO | WO 99/08238 | | 2/1999 |
| WO | WO 99/56227 | | 11/1999 |
| WO | WO 00/30070 | | 5/2000 |
| WO | WO 00/60435 | | 10/2000 |
| WO | WO 00/60435 | A3 | 10/2000 |
| WO | WO 02/073603 | A1 | 9/2002 |
| WO | WO 2006/129967 | A1 | 12/2006 |
| WO | WO 2008/085742 | A2 | 7/2008 |
| WO | WO 2008/109835 | A2 | 9/2008 |
| WO | WO 2011/088053 | A2 | 7/2011 |

OTHER PUBLICATIONS

Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.

Elio, R. et al., "On Abstract Task Models and Conversation Policies," http://webdocs.cs.ualberta.ca/~ree/publications/papers2/ATS.AA99.pdf, May 1999, 10 pages.

Rice, J., et al., "Using the Web Instead of a Window System," Knowledge Systems Laboratory, Stanford University, (http://tomgruber.org/writing/ks1-95-69.pdf, Sep. 1995.) CHI '96 Proceedings: Conference on Human Factors in Computing Systems, Apr. 13-18, 1996, Vancouver, BC, Canada, 14 pages.

Roddy, D., et al., "Communication and Collaboration in a Landscape of B2B eMarketplaces," VerticalNet Solutions, white paper, Jun. 15, 2000, 23 pages.

Lafferty, John et al., "Conditional Random Fields: Probabilistic Models for Segmenting and Labeling Sequence Data," Proceedings of the 18$^{th}$ International Conference on Machine Learning, Morgan Kaufman Publishers, San Francisco, CA, 2001, 8 pages.

Marcus, Mitchell P. et al., "Building a Large Annotated Corpus of English: The Penn Treebank," Computational Linguistics, vol. 19, No. 2, 1993, pp. 313-330.

Glass, J., et al., "Multilingual Spoken-Language Understanding in the MIT Voyager System," Aug. 1995, http://groups.csail.mit.edu/sls/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.

*Phoenix Solutions, Inc.* v. *West Interactive Corp.*, Document 40, Declaration of Christopher Schmandt Regarding the MIT Galaxy System dated Jul. 2, 2010, 162 pages.

Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16...rep..., 4 pages.

Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.

Zue, V., "Conversational Interfaces: Advances and Challenges," Sep. 1997, http://www.cs.cmu.edu/~dod/papers/zue97.pdf, 10 pages.

Zue, V. W., "Toward Systems that Understand Spoken Language," Feb. 1994, ARPA Strategic Computing Institute, © 1994 IEEE, 9 pages.

Alfred App, 2011, http://www.alfredapp.com/, 5 pages.

Ambite, JL., et al., "Design and Implementation of the Calo Query Manager," Copyright © 2006, American Association for Artificial Intelligence, (www.aaai.org), 8 pages.

Ambite, JL., et al., "Integration of Heterogeneous Knowledge Sources in the Calo Query Manager," 2005, the 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.

(56) References Cited

OTHER PUBLICATIONS

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.
Butcher, M., "Evi arrives in town to go toe-to-toe with Siri," Jan. 23, 2012, http://techcrunch.com/2012/01/23/evi-arrives-in-town-to-go-toe-to-toe-with-siri/, 2 pages.
Chen, Y., "Multimedia Siri Finds and Plays Whatever You Ask for," Feb. 9, 2012, http://www.psfk.com/2012/02/multimedia-siri.html, 9 pages.
Cheyer, A. et al., "Spoken Language and Multimodal Applications for Electronic Realties," © Springer-Verlag London Ltd, Virtual Reality 1999, 3:1-15, 15 pages.
Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.
Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.
Evi, "Meet Evi: the one mobile app that provides solutions for your everyday problems," Feb. 8, 2012, http://www.evi.com/, 3 pages.
Feigenbaum, E., et al., "Computer-assisted Semantic Annotation of Scientific Life Works," 2007, http://tomgruber.org/writing/stanford-cs300.pdf, 22 pages.
Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.
Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.
Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.
Glass, A., "Explaining Preference Learning," 2006, http://cs229.stanford.edu/proj2006/Glass-ExplainingPreferenceLearning.pdf, 5 pages.
Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.
Gruber, T. R., "A Translation Approach to Portable Ontology Specifications," Knowledge Systems Laboratory, Stanford University, Sep. 1992, Technical Report KSL 92-71, Revised Apr. 1993, 27 pages.
Gruber, T. R., "Automated Knowledge Acquisition for Strategic Knowledge," Knowledge Systems Laboratory, Machine Learning, 4, 293-336 (1989), 44 pages.
Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.
Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.
Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.
Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.
Gruber, T. R., "Where the Social Web meets the Semantic Web," Presentation at the 5th International Semantic Web Conference, Nov. 7, 2006, 38 pages.
Gruber, T. R., "Despite our Best Efforts, Ontologies are not the Problem," AAAI Spring Symposium, Mar. 2008, http://tomgruber.org/writing/aaai-ss08.htm, 40 pages.
Gruber, T. R., "Enterprise Collaboration Management with Intraspect," Intraspect Software, Inc., Instraspect Technical White Paper Jul. 2001, 24 pages.
Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.
Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.
Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.
Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.
Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.
Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.
Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.
Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.
Gruber, T. R., et al.,"NIKE: A National Infrastructure for Knowledge Exchange," Oct. 1994, http://www.eit.com/papers/nike/nike.html and nike.ps, 10 pages.
Gruber, T. R., "Ontologies, Web 2.0 and Beyond," Apr. 24, 2007, Ontology Summit 2007, http://tomgruber.org/writing/ontolog-social-web-keynote.pdf, 17 pages.
Gruber, T. R., "Ontology of Folksonomy: A Mash-up of Apples and Oranges," Originally published to the web in 2005, Int'l Journal on Semantic Web & Information Systems, 3(2), 2007, 7 pages.
Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.
Gruber, T. R., "TagOntology," Presentation to Tag Camp, www.tagcamp.org, Oct. 29, 2005, 20 pages.
Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.
Gruber, T. R., "Toward Principles for the Design of Ontologies Used for Knowledge Sharing," in International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

(56) References Cited

OTHER PUBLICATIONS

Guzzoni, D., et al., "Active, A Platform for Building Intelligent Operating Rooms," Surgetica 2007 Computer-Aided Medical interventions: tools and applications, pp. 191-198, Paris, 2007, Sauramps Médical, http://lsro.epfl.ch/page-68384-en.html, 8 pages.
Guzzoni, D., et al., "Active, A Tool for Building Intelligent User Interfaces," ASC 2007, Palma de Mallorca, http://lsro.epfl.ch/page-34241.html, 6 pages.
Guzzoni, D., et al., "Modeling Human-Agent Interaction with Active Ontologies," 2007, AAAI Spring Symposium, Interaction Challenges for Intelligent Assistants, Stanford University, Palo Alto, California, 8 pages.
Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.
Intraspect Software, "The Intraspect Knowledge Management Solution: Technical Overview," http://tomgruber.org/writing/intraspect-whitepaper-1998.pdf, 18 pages.
Julia, L., et al., Un éditeur interactif de tableaux dessinés à main levée (an Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
McGuire, J., et al., "SHADE: Technology for Knowledge-Based Collaborative Engineering," 1993, Journal of Concurrent Engineering: Applications and Research (CERA), 18 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
Rice, J., et al., "Monthly Program: Nov. 14, 1995," The San Francisco Bay Area Chapter of ACM SIGCHI, http://www.baychi.org/calendar/19951114/, 2 pages.
Rivlin, Z., et al., "Maestro: Conductor of Multimedia Analysis Technologies," 1999 SRI International, Communications of the Association for Computing Machinery (CACM), 7 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http://www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakTolt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.
YouTube,"Send Text, Listen to and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.
YouTube,"Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.
International Search Report and Written Opinion dated Nov. 29, 2011, International Application No. PCT/US2011/20861, which corresponds to US Application No. 12/987,982, 15 pages. (Thomas Robert Gruber).
Agnäs, MS., et al., "Spoken Language Translator: First-Year Report," Jan. 1994, SICS (ISSN 0283-3638), SRI and Telia Research AB, 161 pages.
Allen, J., "Natural Language Understanding," 2nd Edition, Copyright © 1995 by the Benjamin/Cummings Publishing Company, Inc., 671 pages.
Alshawi, H., et al., "CLARE: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the BANKAI Workshop on Intelligent Information Access, 12 pages.
Alshawi H., et al., "Logical Forms in the Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z 1992.
Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.

(56) References Cited

OTHER PUBLICATIONS

Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to Improve Document Retrieval," 1998, SRI International, Menlo Park, California, 11 pages.
Berry, P., et al., "Task Management under Change and Uncertainty Constraint Solving Experience with the CALO Project," 2005, Proceedings of CP'05 Workshop on Constraint Solving under Change, 5 pages.
Bobrow, R. et al., "Knowledge Representation for Syntactic/Semantic Processing," From: AAA-80 Proceedings. Copyright © 1980, AAAI, 8 pages.
Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.
Carter, D., "Lexical Acquisition in the Core Language Engine," 1989, Proceedings of the Fourth Conference of the European Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.
Codd, E. F., "Databases: Improving Usability and Responsiveness—'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLDB Conference, New York, 5 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.
Dowding, J., et al., "Gemini: A Natural Language System for Spoken-Language Understanding," 1993, Proceedings of the Thirty-First Annual Meeting of the Association for Computational Linguistics, 8 pages.
Dowding, J., et al., "Interleaving Syntax and Semantics in An Efficient Bottom-Up Parser," 1994, Proceedings of the 32nd Annual Meeting of the Association for Computational Linguistics, 7 pages.
Epstein, M., et al., "Natural Language Access to a Melanoma Data Base," Sep. 1978, SRI International, 7 pages.
Exhibit 1, "Natural Language Interface Using Constrained Intermediate Dictionary of Results," Classes/Subclasses Manually Reviewed for the Search of US Patent No. 7,177,798, Mar. 22, 2013, 1 page.
Exhibit 1, "Natural Language Interface Using Constrained Intermediate Dictionary of Results," List of Publications Manually reviewed for the Search of US Patent No. 7,177,798, Mar. 22, 2013, 1 page.
Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.
Fikes, R., et al., "A Network-based knowledge Representation and its Natural Deduction System," Jul. 1977, SRI International, 43 pages.
Gambäck, B., et al., "The Swedish Core Language Engine," 1992 NOTEX Conference, 17 pages.
Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSS Access on the WWW: An Intelligent Agent Prototype," 1998 Proceedings of the Americas Conference on Information Systems-Association for Information Systems, 3 pages.
Grishman, R., "Computational Linguistics: An Introduction," © Cambridge University Press 1986, 172 pages.
Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "TEAM: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, A platform for Building Intelligent Software," Computational Intelligence 2006, 5 pages. http://www.informatik.uni-trier.de/~ley/pers/hd/g/Guzzoni:Didier.
Guzzoni, D., "Active: A unified platform for building intelligent assistant applications," Oct. 25, 2007, 262 pages.
Guzzoni, D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.

(56) References Cited

OTHER PUBLICATIONS

Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," The Robotics Institute, Carnegie-Mellon University, paper, Oct. 1, 1997, 14 pages.
Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI International, 27 pages.
Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages. Best Copy Available.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.
Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992, Computer, Speech and Language, 14 pages.
Issar, S., et al., "CMU's Robust Spoken Language Understanding System," 1993, Proceedings of EUROSPEECH, 4 pages.
Issar, S., "Estimation of Language Models for New Spoken Language Applications," Oct. 3-6, 1996, Proceedings of 4th International Conference on Spoken language Processing, Philadelphia, 4 pages.
Janas, J., "The Semantics-Based Natural Language Interface to Relational Databases," © Springer-Verlag Berlin Heidelberg 1986, Germany, 48 pages.
Johnson, J., "A Data Management Strategy for Transportable Natural Language Interfaces," Jun. 1989, doctoral thesis submitted to the Department of Computer Science, University of British Columbia, Canada, 285 pages.
Julia, L., et al., "http://www.speech.sri.com/demos/atis.html," 1997, Proceedings of AAAI, Spring Symposium, 5 pages.
Kahn, M., et al., "CoABS Grid Scalability Experiments," 2003, Autonomous Agents and Multi-Agent Systems, vol. 7, 8 pages.
Kamel, M., et al., "A Graph Based Knowledge Retrieval System," © 1990 IEEE, 7 pages.
Katz, B., "Annotating the World Wide Web Using Natural Language," 1997, Proceedings of the 5th RIAO Conference on Computer Assisted Information Searching on the Internet, 7 pages.
Katz, B., "A Three-Step Procedure for Language Generation," Dec. 1980, Massachusetts Institute of Technology, Artificial Intelligence Laboratory, 42 pages.
Kats, B., et al., "Exploiting Lexical Regularities in Designing Natural Language Systems," 1988, Proceedings of the 12th International Conference on Computational Linguistics, Coling'88, Budapest, Hungary, 22 pages.
Katz, B., et al., "REXTOR: A System for Generating Relations from Natural Language," In Proceedings of the ACL Oct. 2000 Workshop on Natural Language Processing and Information Retrieval (NLP &IR), 11 pages.
Katz, B., "Using English for Indexing and Retrieving," 1988 Proceedings of the 1st RIAO Conference on User-Oriented Content-Based Text and Image (RIAO'88), 19 pages.
Konolige, K., "A Framework for a Portable Natural-Language Interface to Large Data Bases," Oct. 12, 1979, SRI International, Artificial Intelligence Center, 54 pages.
Laird, J., et al., "SOAR: An Architecture for General Intelligence," 1987, Artificial Intelligence vol. 33, 64 pages.
Larks, "Intelligent Software Agents: Larks," 2006, downloaded on Mar. 15, 2013 from http://www.cs.cmu.edu/larks.html, 2 pages.
Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.
Martin, D., et al., "Development Tools for the Open Agent Architecture," Apr. 1996, Proceedings of the International Conference on the Practical Application of Intelligent Agents and Multi-Agent Technology, 17 pages.
Martin, D., et al., "Information Brokering in an Agent Architecture," Apr. 1997, Proceedings of the second International Conference on the Practical Application of Intelligent Agents and Multi-Agent Technology, 20 pages.
Martin, D., et al., "PAAM '98 Tutorial: Building and Using Practical Agent Applications," 1998, SRI International, 78 pages.
Martin, P., et al., "Transportability and Generality in a Natural-Language Interface System," Aug. 8-12, 1983, Proceedings of the Eight International Joint Conference on Artificial Intelligence, West Germany, 21 pages.
Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.
Michos, S.E., et al., "Towards an adaptive natural language interface to command languages," Natural Language Engineering 2 (3), © 1994 Cambridge University Press, 19 pages. Best Copy Available.
Milstead, J., et al., "Metadata: Cataloging by Any Other Name . . . " Jan. 1999, ONLINE, Copyright © 1999 Information Today, Inc., 18 pages.
Minker, W., et al., "Hidden Understanding Models for Machine Translation," 1999, Proceedings of ETRW on Interactive Dialogue in Multi-Modal Systems, 4 pages.
Modi, P. J., et al., "CMRadar: A Personal Assistant Agent for Calendar Management," © 2004, American Association for Artificial Intelligence, Intelligent Systems Demonstrations, 2 pages.
Moore, R., et al., "Combining Linguistic and Statistical Knowledge Sources in Natural-Language Processing for ATIS," 1995, SRI International, Artificial Intelligence Center, 4 pages.
Moore, R., "Handling Complex Queries in a Distributed Data Base," Oct. 8, 1979, SRI International, Artificial Intelligence Center, 38 pages.
Moore, R., "Practical Natural-Language Processing by Computer," Oct. 1981, SRI International, Artificial Intelligence Center, 34 pages.
Moore, R., et al., "SRI's Experience with the ATIS Evaluation," Jun. 24-27, 1990, Proceedings of a workshop held at Hidden Valley, Pennsylvania, 4 pages. Best Copy Available.
Moore, et al., "The Information Warefare Advisor: An Architecture for Interacting with Intelligent Agents Across the Web," Dec. 31, 1998 Proceedings of Americas Conference on Information Systems (AMCIS), 4 pages.
Moore, R., "The Role of Logic in Knowledge Representation and Commonsense Reasoning," Jun. 1982, SRI International, Artificial Intelligence Center, 19 pages.
Moore, R., "Using Natural-Language Knowledge Sources in Speech Recognition," Jan. 1999, SRI International, Artificial Intelligence Center, 24 pages.

(56) References Cited

OTHER PUBLICATIONS

Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.
Moran, D., "Quantifier Scoping in the SRI Core Language Engine," 1988, Proceedings of the 26th annual meeting on Association for Computational Linguistics, 8 pages.
Motro, A., "Flex: A Tolerant and Cooperative User Interface to Databases," IEEE Transactions on Knowledge and Data Engineering, vol. 2, No. 2, Jun. 1990, 16 pages.
Murveit, H., et al., "Speech Recognition in SRI's Resource Management and ATIS Systems," 1991, Proceedings of the workshop on Speech and Natural Language (HTL'91), 7 pages.
OAA, "The Open Agent Architecture 1.0 Distribution Source Code," Copyright 1999, SRI International, 2 pages.
Odubiyi, J., et al., "SAIRE—a scalable agent-based information retrieval engine," 1997 Proceedings of the First International Conference on Autonomous Agents, 12 pages.
Owei, V., et al., "Natural Language Query Filtration in the Conceptual Query Language," © 1997 IEEE, 11 pages.
Pannu, A., et al., "A Learning Personal Agent for Text Filtering and Notification," 1996, The Robotics Institute School of Computer Science, Carnegie-Mellon University, 12 pages.
Pereira, "Logic for Natural Language Analysis," Jan. 1983, SRI International, Artificial Intelligence Center, 194 pages.
Perrault, C.R., et al., "Natural-Language Interfaces," Aug. 22, 1986, SRI International, 48 pages.
Pulman, S.G., et al., "Clare: A Combined Language and Reasoning Engine," 1993, Proceedings of JFIT Conference, 8 pages. URL: http://www.cam.sri.com/tr/crc042/paper.ps.Z.
Ravishankar, "Efficient Algorithms for Speech Recognition," May 15, 1996, Doctoral Thesis submitted to School of Computer Science, Computer Science Division, Carnegie Mellon University, Pittsburg, 146 pages.
Rayner, M., et al., "Adapting the Core Language Engine to French and Spanish," May 10, 1996, Cornell University Library, 9 pages. http://arxiv.org/abs/cmp-lg/9605015.
Rayner, M., "Abductive Equivalential Translation and its application to Natural Language Database Interfacing," Sep. 1993 Dissertation paper, SRI International, 163 pages.
Rayner, M., et al., "Deriving Database Queries from Logical Forms by Abductive Definition Expansion," 1992, Proceedings of the Third Conference on Applied Natural Language Processing, ANLC'92, 8 pages.
Rayner, M., "Linguistic Domain Theories: Natural-Language Database Interfacing from First Principles," 1993, SRI International, Cambridge, 11 pages.
Rayner, M., et al., "Spoken Language Translation With Mid-90's Technology: A Case Study," 1993, EUROSPEECH, ISCA, 4 pages. http://dblp.uni-trier.de/db/conf/interspeech/eurospeech1993.html#RaynerBCCDGKKLPPS93.
Russell, S., et al., "Artificial Intelligence, A Modern Approach," © 1995 Prentice Hall, Inc., 121 pages.
Sacerdoti, E., et al., "A Ladder User's Guide (Revised)," Mar. 1980, SRI International, Artificial Intelligence Center, 39 pages.
Sagalowicz, D., "A D-Ladder User's Guide," Sep. 1980, SRI International, 42 pages.
Sameshima, Y., et al., "Authorization with security attributes and privilege delegation Access control beyond the ACL," Computer Communications, vol. 20, 1997, 9 pages.
San-Segundo, R., et al., "Confidence Measures for Dialogue Management in the CU Communicator System," Jun. 5-9, 2000, Proceedings of Acoustics, Speech, and Signal Processing (ICASSP'00), 4 pages.
Sato, H., "A Data Model, Knowledge Base, and Natural Language Processing for Sharing a Large Statistical Database," 1989, Statistical and Scientific Database Management, Lecture Notes in Computer Science, vol. 339, 20 pages.
Schnelle, D., "Context Aware Voice User Interfaces for Workflow Support," Aug. 27, 2007, Dissertation paper, 254 pages.
Sharoff, S., et al., "Register-domain Separation as a Methodology for Development of Natural Language Interfaces to Databases," 1999, Proceedings of Human-Computer Interaction (INTERACT'99), 7 pages.
Shimazu, H., et al., "CAPIT: Natural Language Interface Design Tool with Keyword Analyzer and Case-Based Parser," NEC Research & Development, vol. 33, No. 4, Oct. 1992, 11 pages.
Shinkle, L., "Team User's Guide," Nov. 1984, SRI International, Artificial Intelligence Center, 78 pages.
Shklar, L., et al., "Info Harness: Use of Automatically Generated Metadata for Search and Retrieval of Heterogeneous Information," 1995 Proceedings of CAiSE'95, Finland.
Singh, N., "Unifying Heterogeneous Information Models," 1998 Communications of the ACM, 13 pages.
Starr, B., et al., "Knowledge-Intensive Query Processing," May 31, 1998, Proceedings of the 5th KRDB Workshop, Seattle, 6 pages.
Stern, R., et al. "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments ," 1999, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the TACITUS Natural Language System," May 1990, SRI International, Artificial Intelligence Center, 16 pages.
Wahlster, W., et al., "Smartkorm multimodal communication with a life-like character," 2001 EUROSPEECH—Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages. Best Copy Available.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.

(56) References Cited

OTHER PUBLICATIONS

Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of The Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris—France, Jul. 1993, 11 pages.
Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.
Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., ED, Directions and Challenges, 15th Annual Technical Symposium, Jun. 17, 1976, Gaithersbury, Maryland, 7 pages.
Bulyko, I. et al., "Error-Correction Detection and Response Generation in a Spoken Dialogue System," © 2004 Elsevier B.V., specom.2004.09.009, 18 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of A Personalized Information Grazing Service," INFOCOM'90, Ninth Annual Joint Conference of the IEEE

(56) References Cited

OTHER PUBLICATIONS

Computer and Communication Societies, Jun. 3-7, 1990, http://slrohall.com/publications/, 8 pages.
Bussler, C., et al., "Web Service Execution Environment (WSMX)," Jun. 3, 2005, W3C Member Submission, http://www.w3.org/Submission/WSMX, 29 pages.
Buzo, A., et al., "Speech Coding Based Upon Vector Quantization," IEEE Transactions on Acoustics, Speech, and Signal Processing, vol. Assp-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Cheyer, A., "About Adam Cheyer," Sep. 17, 2012, http://www.adam.cheyer.com/about.html, 2 pages.
Cheyer, A., "A Perspective on AI & Agent Technologies for SCM," VerticalNet, 2001 presentation, 22 pages.
Conklin, J., "Hypertext: An Introduction and Survey," COMPUTER Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Cox, R. V., et al., "Speech and Language Processing for Next-Millennium Communications Services," Proceedings of the IEEE, vol. 88, No. 8, Aug. 2000, 24 pages.
Davis, Z., et al., "A Personal Handheld Multi-Modal Shopping Assistant," 2006 IEEE, 9 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," in Proceedings of CHI'91 Proceedings of the Sigchi Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 534304, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "Fir Filter Properties," dspGuro, Digital Signal Processing Central, http://www.dspguru.com/dsp/tags/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.
Kubala, F., et al., "Speaker Adaptation from a Speaker-Independent Training Corpus," International Conference on Acoustics, Speech, and Signal Processing (ICASSP'90), Apr. 3-6, 1990, 4 pages.
Kubala, F., et al., "The Hub and Spoke Paradigm for CSR Evaluation," Proceedings of the Spoken Language Technology Workshop, Mar. 6-8, 1994, 9 pages.
Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.
Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.

(56) References Cited

OTHER PUBLICATIONS

Lee, L, et al., "Golden Mandarin(II)—An Improved Single-Chip Real-Time Mandarin Dictation Machine for Chinese Language with Very Large Vocabulary," 0-7803-0946-4/93 © 1993 IEEE, 4 pages.
Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.
Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.
Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.
Linde, Y., et al., "An Algorithm for Vector Quantizer Design," IEEE Transactions on Communications, vol. 28, No. 1, Jan. 1980, 12 pages.
Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.
Logan, B., "Mel Frequency Cepstral Coefficients for Music Modeling," In International Symposium on Music Information Retrieval, 2000, 2 pages.
Lowerre, B. T., "The-Harpy Speech Recognition System," Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.
Markel, J. D., et al., "Linear Prediction of Speech," Springer-Verlag, Berlin Heidelberg New York 1976, 12 pages.
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
Morgan, B., "Business Objects," (Business Objects for Windows) Business Objects Inc., DBMS Sep. 1992, vol. 5, No. 10, 3 pages.
Mountford, S. J., et al., "Talking and Listening to Computers," The Art of Human-Computer Interface Design, Copyright © 1990 Apple Computer, Inc. Addison-Wesley Publishing Company, Inc., 17 pages.
Murty, K. S. R., et al., "Combining Evidence from Residual Phase and MFCC Features for Speaker Recognition," IEEE Signal Processing Letters, vol. 13, No. 1, Jan. 2006, 4 pages.
Murveit H. et al., "Integrating Natural Language Constraints into HMM-based Speech Recognition," 1990 International Conference on Acoustics, Speech, and Signal Processing, Apr. 3-6, 1990, 5 pages.
Nakagawa, S., et al., "Speaker Recognition by Combining MFCC and Phase Information," IEEE International Conference on Acoustics Speech and Signal Processing (ICASSP), Mar. 14-19, 2010, 4 pages.
Niesler, T. R., et al., "A Variable-Length Category-Based *N*-Gram Language Model," IEEE International Conference on Acoustics, Speech, and Signal Processing (ICASSP'96), vol. 1, May 7-10, 1996, 6 pages.
Papadimitriou, C. H., et al., "Latent Semantic Indexing: A Probabilistic Analysis," Nov. 14, 1997, http://citeseerx.ist.psu.edu/messages/downloadsexceeded.html, 21 pages.
Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.
Parsons, T. W., "Voice and Speech Processing," Pitch and Formant Estimation, © 1987 McGraw-Hill, Inc., ISBN: 0-07-0485541-0, 15 pages.
Picone, J., "Continuous Speech Recognition Using Hidden Markov Models," IEEE ASSP Magazine, vol. 7, No. 3, Jul. 1990, 16 pages.
Rabiner, L. R., et al., "Fundamental of Speech Recognition," © 1993 AT&T, Published by Prentice-Hall, Inc., ISBN: 0-13-285826-6, 17 pages.
Rabiner, L. R., et al., "Note on the Properties of a Vector Quantizer for LPC Coefficients," The Bell System Technical Journal, vol. 62, No. 8, Oct. 1983, 9 pages.
Ratcliffe, M., "ClearAccess 2.0 allows SQL searches off-line," (Structured Query Language), ClearAcess Corp., MacWeek Nov. 16, 1992, vol. 6, No. 41, 2 pages.
Remde, J. R., et al., "SuperBook: An Automatic Tool for Information Exploration-Hypertext?," In Proceedings of Hypertext'87 papers, Nov. 13-15, 1987, 14 pages.
Reynolds, C. F., "On-Line Reviews: A New Application of the Hicom Conferencing System," IEE Colloquium on Human Factors in Electronic Mail and Conferencing Systems, Feb. 3, 1989, 4 pages.
Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.
Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.
Rivoira, S., et al., "Syntax and Semantics in a Word-Sequence Recognition System," IEEE International Conference on Acoustics, Speech, and Signal Processing (ICASSP'79), Apr. 1979, 5 pages.
Roddy, D., et al., "Communication and Collaboration in a Landscape of B2B eMarketplaces," VerticalNet Solutions, white paper, Jun. 15, 2000, 24 pages.
Rosenfeld, R., "A Maximum Entropy Approach to Adaptive Statistical Language Modelling," Computer Speech and Language, vol. 10, No. 3, Jul. 1996, 25 pages.
Roszkiewicz, A., "Extending your Apple," Back Talk—Lip Service, A+ Magazine, The Independent Guide for Apple Computing, vol. 2, No. 2, Feb. 1984, 5 pages.
Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.
Salton, G., et al., "On the Application of Syntactic Methodologies in Automatic Text Analysis," Information Processing and Management, vol. 26, No. 1, Great Britain 1990, 22 pages.
Savoy, J., "Searching Information in Hypertext Systems Using Multiple Sources of Evidence," International Journal of Man-Machine Studies, vol. 38, No. 6, Jun. 1993, 15 pages.
Scagliola, C., "Language Models and Search Algorithms for Real-Time Speech Recognition," International Journal of Man-Machine Studies, vol. 22, No. 5, 1985, 25 pages.
Schmandt, C., et al., "Augmenting a Window System with Speech Input," IEEE Computer Society, Computer Aug. 1990, vol. 23, No. 8, 8 pages.
Schütze, H., "Dimensions of Meaning," Proceedings of Supercomputing'92 Conference, Nov. 16-20, 1992, 10 pages.
Sheth B., et al., "Evolving Agents for Personalized Information Filtering," In Proceedings of the Ninth Conference on Artificial Intelligence for Applications, Mar. 1-5, 1993, 9 pages.
Shikano, K., et al., "Speaker Adaptation Through Vector Quantization," IEEE International Conference on Acoustics, Speech, and Signal Processing (ICASSP'86), vol. 11, Apr. 1986, 4 pages.
Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.
Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.
SRI2009, "SRI Speech: Products: Software Development Kits: EduSpeak," 2009, 2 pages, available at http://web.archive.org/web/20090828084033/http://www.speechatsri.com/products/eduspeak.shtml.
Tenenbaum, A.M., et al., "Data Structure Using Pascal," 1981 Prentice-Hall, Inc., 34 pages.

(56) References Cited

OTHER PUBLICATIONS

Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.
Udell, J., "Computer Telephony," BYTE, vol. 19, No. 7, Jul. 1, 1994, 9 pages.
van Santen, J. P. H., "Contextual Effects on Vowel Duration," Journal Speech Communication, vol. 11, No. 6, Dec. 1992, 34 pages.
Vepa, J., et al., "New Objective Distance Measures for Spectral Discontinuities in Concatenative Speech Synthesis," In Proceedings of the IEEE 2002 Workshop on Speech Synthesis, 4 pages.
Verschelde, J., "MATLAB Lecture 8. Special Matrices in MATLAB," Nov. 23, 2005, UIC Dept. of Math., Stat. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Universite de Lausanne, Switzerland, 1994, Fundamentals of Speech Synthesis and Speech Recognition: Basic Concepts, State of the Art, and Future Challenges, 18 pages.
Wikipedia, "Mel Scale," Wikipedia, the free encyclopedia, last modified page date: Oct. 13, 2009, http://en.wikipedia.org/wiki/Mel_scale, 2 pages.
Wikipedia, "Minimum Phase," Wikipedia, the free encyclopedia, last modified page date: Jan. 12, 2010, http://en.wikipedia.orq/wiki/Minimum_phase, 8 pages.
Wolff, M., "Poststructuralism and the ARTFUL Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture—2 course presentation, University of Maryland, College Park, 8 pages.
Wu, M., "Speech Recognition, Synthesis, and H.C.I.," ENEE408G Capstone-Multimedia Signal Processing, Spring 2003, Lecture—3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," COMPUTER Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 5th ISCA Speech Synthesis Workshop—Pittsburgh, Jun. 14-16, 2004, 2 pages.
International Search Report dated Nov. 9, 1994, in International Application No. PCT/US1993/12666, which corresponds to U.S. Appl. No. 07/999,302, 8 pages (Robert Don Strong).
International Preliminary Examination Report dated Mar. 1, 1995, in International Application No. PCT/US1993/12666, which corresponds to U.S. Appl. No. 07/999,302, 5 pages (Robert Don Strong).
International Preliminary Examination Report dated Apr. 10, 1995, in International Application No. PCT/US1993/12637, which corresponds to U.S. Appl. No. 07/999,354, 7 pages (Alejandro Acero).
International Search Report dated Feb. 8, 1995, in International Application No. PCT/US1994/11011, which corresponds to U.S. Appl. No. 08/129,679, 7 pages (Yen-Lu Chow).
International Preliminary Examination Report dated Feb. 28, 1996, in International Application No. PCT/US1994/11011, which corresponds to U.S. Appl. No. 08/129,679, 4 pages (Yen-Lu Chow.
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, in International Application No. PCT/US1995/08369, which corresponds to U.S. Appl. No. 08/271,639, 6 pages (Peter V. De Souza).
International Preliminary Examination Report dated Oct. 9, 1996, in International Application No. PCT/US1995/08369, which corresponds to U.S. Appl. No. 08/271,639, 4 pages (Peter V. De Souza).

* cited by examiner

300

COMBINED STATISTICAL AND RULE-BASED PART-OF-SPEECH TAGGING FOR TEXT-TO-SPEECH SYNTHESIS

FIELD OF THE INVENTION

Embodiments of the invention relate generally to the field of text-to-speech (TTS) synthesis; and more particularly, to part-of-speech (POS) tagging for TTS.

BACKGROUND

In corpus linguistics, part-of-speech (POS) tagging is the process of marking up the words in a text (corpus) as corresponding to a particular part of speech, based on both its definition, as well as its context—i.e., relationship with adjacent and related words in a phrase, sentence, or paragraph. It is a necessary pre-processing step for many natural language processing (NLP) tasks. As POS tags augment the information contained within words by explicitly indicating some of the structures inherent in language, their accuracy is often critical to down-stream NLP applications. For example, in concatenative text-to-speech (TTS) synthesis, POS tags are heavily relied upon in the context of prosody modeling; they greatly influence how natural synthetic speech sounds. It is therefore crucial that they be correct.

With the growing availability of NLP training resources in recent years, POS tagging has increasingly involved some forms of data-driven processing. State-of-art models based on conditional random fields (CRFs), for instance, are trained to identify the most likely sequence of tags for the observed set of words in a given sentence. These models rely on feature functions acting as marginal constraints to ensure that important characteristics of the empirical training distribution are reflected in the trained model. With well chosen functions covering sufficiently rich features of the training data, and given adequate initial conditions, CRF taggers can achieve a very high level of tag accuracy on general NLP corpora.

In some specific applications, however, such taggers may be too generic to fit the problem requirements. Most tasks involve slightly different sets of features functions, whose extraction may be impossible to perform on standard NLP collections if they have not been annotated to support it. This is the case for TTS speech synthesis, for which features typically considered in mainstream NLP are not sufficient. Conventional POS tagging for TTS therefore tends to rely on rule-based systems, which can easily be developed from smaller, special-purpose databases. Such rule-based taggers tend to be more brittle than statistical models trained on large collections.

Given a natural language sentence including L words, POS tagging aims at assigning to each observed word $w_i$ some suitable POS $p_i$, $1 \le i \le L$. Representing the overall sequence of words by W and the corresponding sequence of POS by P, CRF taggers directly maximize the conditional probability Pr (P|W) over all possible POS sequences P. This is done via log-linear modeling of feature functions expressing important aspects of the empirical training distribution, as observed on a large annotated corpus. The size and pertinence of the training corpus is thus critical to the quality of the resulting models.

There is, however, an inherent trade-off between size and pertinence. Standard NLP corpora tend to be suitably extensive, but fairly generic in terms of supported tag set and associated annotation. Most of them use the default Penn Treebank POS tag set, which is not optimal for a TTS synthesis application. For example, in the sentence:

She is coming tomorrow, she is, she really is!

The three instances of the word "is" would normally be assigned the same tag (e.g., VBZ). Yet, they are realized three different ways. The first instance is unaccented and reduced; the second one is accented; and the third one is unaccented but with full vowed quality. Any synthetic version not respecting these rendition patterns would not sound natural. It thus stands to reason that a TTS system would benefit from a POS assignment system which reflects such distinctions. At the very least, the first instance of "is" should be assigned a POS that typically carries no accent, such as auxiliary, and the second a POS that typically carries an accent, such as (non-modal) verb.

The problem is that special-purpose corpora created with such specific application in mind tend to be too small for the reliable estimation of CRF parameters. This is why POS tagging for speech synthesis typically relies on rule-based taggers. They can easily take into account the kind of distinctions exemplified in a typical statistical model POS tagger, including the case of the third instance of "is", which is clearly very specific to the application at hand. On the other hand, they suffer from several potential drawbacks, including lack of portability, maintenance difficulties, and the risk of over-generalization from a small number of exemplars.

SUMMARY OF THE DESCRIPTION

According to one aspect, in response to a word of a text sequence, a first part-of-speech (POS) tag is generated using a statistical part-of-speech (POS) tagger based on a corpus of trained text sequences, each representing a likely POS of a word for a given text sequence. A second POS tag is generated using a rule-based POS tagger based on a set of one or more rules associated with a type of an application associated with the text sequence. A final POS tag is assigned to the word of the text sequence for TTS synthesis based on the first POS tag and the second POS tag.

According to another aspect, an apparatus for text-to-speech (TTS) synthesis includes a statistical POS tagger, in response to a word of a text sequence, to generate a first part-of-speech (POS) tag based on a corpus of trained text sequences, each representing a likely POS of a word for a given text sequence, a rule-based POS tagger to generate a second POS tag based on a set of one or more rules associated with a type of an application associated with the text sequence, and a text analyzer coupled to the statistical POS tagger and the rule-based POS tagger to assign a final POS tag to the word of the text sequence for TTS synthesis based on the first POS tag and the second POS tag.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a TTS synthesis system combines rule-based POS tagging and statistical POS tagging techniques. Complementing a rule-based system with a statistical tagger solves many of the problems described above. The rules can now be focused on situations that are high-value for the application considered; in principle they can be fewer, simpler, and therefore more manageable. At the same time, generic NLP training data can be leveraged to increase tagging robustness, without sacrificing specific requirements for the task at hand. An embodiment of the TTS system adopts a hybrid system where the two tagging approaches render independent assessments of each input word, one of which is then selected based on the underlying conditions in order to produce the final POS tag for the word.

Figure 1:
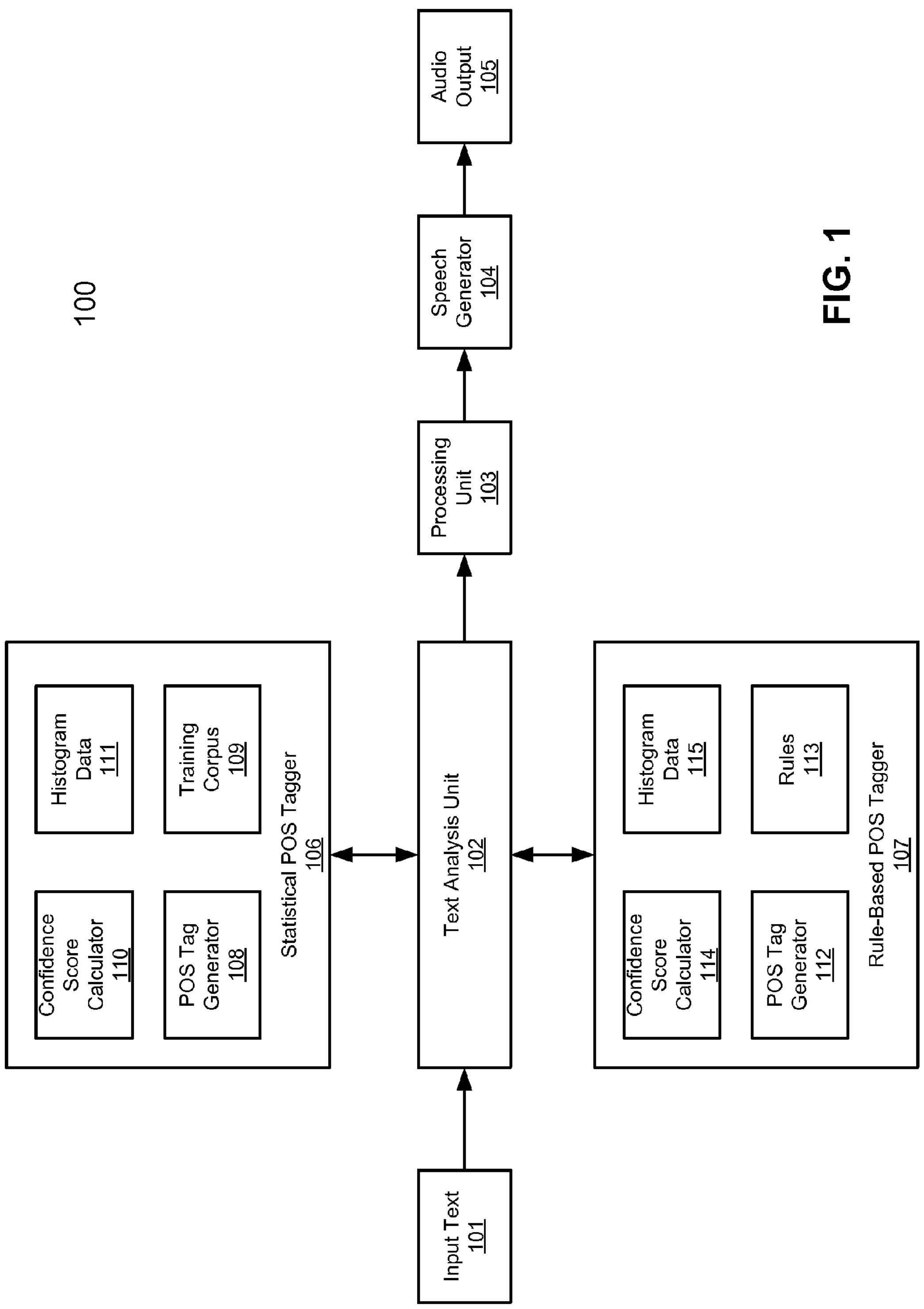
FIG. 1 is a block diagram illustrating a TTS system according to one embodiment of the invention.

FIG. 1 is a block diagram illustrating a TTS system according to one embodiment of the invention. Referring to FIG. 1, system 100 is configured to assign POS tags to words to perform natural language processing. For example, the POS tags are assigned to words to perform a concatenative TTS synthesis. System 100 includes, but not limited to, text analysis unit 102, processing unit 103, speech generation unit 104, statistical POS tagger 106 and rule-based POS tagger 107. Text analysis unit 102 is configured to receive text input 101, for example, one or more sentences, paragraphs, and the like, and to analyze the text to extract words. Text analysis unit 102 is configured to determine characteristics of a word, for example a pitch, duration, accent, and POS characteristic. The POS characteristic typically defines whether a word in a sentence is, for example, a noun, verb, adjective, preposition, and/or the like. The POS characteristics may be very informative, and sometimes are the only way to distinguish a word from the word candidates for speech synthesis. In one embodiment, text analysis unit 102 determines input word's characteristics, such as a pitch, duration, and/or accent based on the POS characteristic of the input word. In one embodiment, text analysis unit 102 analyzes text input 101 to determine a POS characteristic of a word of input text 101 using combined statistical and rule-based POS tagging techniques.

In one embodiment, in response to a word of a text sequence such as input text 101, text analysis unit 101 is configured to invoke statistical POS tagger 106 and rule-based POS tagger 107 to generate a first POS tag and a second POS tag, respectively. Based on the first POS tag and the second POS tag, a final POS tag is selected from one of the first and second POS tags based on certain underlying conditions and the final POS tag is then assigned to the word for TTS synthesis process.

The statistical POS tagging is implemented using a statistical tagger, which determines parameters by computing statistics on words used in a sample portion of a corpus. Once the statistics are computed, the statistical tagger relies on them when analyzing the large corpus. With the statistical approach, a statistical tagger is initially operated in a training mode in which it receives input strings that have been annotated by a linguist with tags that specify parts of speech, and other characteristics. The statistical tagger records statistics reflecting the application of the tags to portions of the input string. After a significant amount of training using tagged input strings, the statistical tagger enters a tagging mode in which it receives raw untagged input strings. In the tagging mode, the statistical tagger applies the learned statistics assembled during the training mode to build trees for the untagged input string. Statistical approaches usually require a training corpus that has been tagged with part-of-speech information, manually and/or automatically through feedback.

A rule-based tagger stores knowledge about the structure of language in the form of linguistic rules. The rule-based tagger makes use of syntactic and morphological information about individual words found in the dictionary or "lexicon" or derived through morphological processing. Successful tagging requires that the tagger has the necessary rules and a lexical analyzer provides all the details needed by the tagger to resolve as many ambiguities as it can at that level.

Referring to FIG. 1, statistical POS tagger 106 can be any of the probabilistic model based POS tagger, such as, for example, a memory-based tagger, a hidden Markov model (HMM) based tagger, and a maximum entropy Markov model (MEMM) based tagger. In one embodiment, statistical POS tagger 106 is a CRF-based tagger. A CRF is a type of discriminative probabilistic model most often used for labeling or parsing of sequential data, such as natural language text or biological sequences. Specifically, CRFs find applications in shallow parsing, named entity recognition and gene finding, among other tasks, being an alternative to the HMM model. Further detailed information concerning the CRF model can be found in article entitled "Conditional Random Fields: Probabilistic Models for Segmenting and Labeling Sequence Data", which is incorporated by reference herein in its entirety.

In one embodiment, statistical POS tagger 106 includes POS tag generator 108, training corpus 109, confidence score calculator 110, and histogram data 111. Given a word of a text sequence, POS tag generator 108 is configured to generate a POS tag based on the relationships between that word and other words in the text sequence in view of training corpus 109. Training corpus 109 includes a pool of training words and training word sequences. The POS tag represents a part of speech that most likely the word can represent in view of the training corpus 109, which can be implemented based on the Penn Treebank corpus or the like. Histogram data 111 is configured to store statistics of application of each training word and/or word sequence in corpus 109 concerning whether that particular word or word sequence has been applied successfully. Success/failure is typically determined based on some held-out data (e.g., a fairly small annotated corpus that would not be sufficient to train a statistical training corpus, but is adequate for this purpose). Confidence score calculator 110 is configured to calculate a confidence score for each of the words and word sequences, where the confidence score represents a successful rate of the application in the past. The confidence scores may be statically calculated and stored in a machine readable storage medium such as a memory or alternatively, the confidence score may be calculated dynamically (e.g., on the fly) during the parsing mode.

Similarly, according to one embodiment, rule-based POS tagger 107 includes POS tag generator 112, a set of rules 113, confidence score calculator 114, and histogram data 115. Given a word of a text sequence, POS tag generator 112 is configured to generate a POS tag based on the relationships between that word and other words in the text sequence in view of rules 113, which have been constructed previously. Histogram data 115 is configured to store statistics of application of each of the rules 113 concerning whether that particular word or word sequence has been applied successfully. Confidence score calculator 114 is configured to calculate a confidence score for each of the words and word sequences, where the confidence score represents a successful rate of the application of a particular rule in the past. The confidence scores may be statically calculated and stored in a machine readable storage medium such as a memory or alternatively, the confidence score may be calculated dynamically.

Once the words have been tagged with one of the tags generated by statistical tagger 106 and rule-based tagger 107, text analysis unit 102 passes the extracted words having assigned POS tags to processing unit 103. Processing unit 103 may concatenate the extracted words together, smooth the transitions between the concatenated words, and pass the concatenated words to speech generating unit 104 to enable the generation of a naturalized audio output 105, for example, an utterance, spoken paragraph, and the like.

According to some embodiments, by adopting a hybrid system where the statistical and rule-based tagging approaches tender independent assessments of each input word, one of which is then selected based on the underlying conditions in order to produce a final POS tag for the word, there could be at least three situations dependent upon the level of consistency between the two models.

The first situation is referred to as a consistent POS situation in which both statistical and rule-based approaches render the same assessment in terms of POS tag (e.g., same tag), possibly after the tag conversion if the two underlying tag sets are different. Tag conversion involves a table that translates symbols from a particular tag set (e.g., "NN" in the Penn Treebank tag set) into symbols from another tag set (e.g., "Noun" in another tag set such as one from Apple Inc.) Most cases are fairly straightforward, though some may be more complex (e.g., "IN" in Penn Treebank maps to either "Prep" or "Conj" in another) Since the two tagging techniques agree on a common tag, according to one embodiment, the final POS tag is selected to be that common tag.

The second situation is referred to as a rule default situation in which the rule-based system did not find a suitable rule to apply to the input context. As a result, a default tag is generated by the rule-based system. This typically forces an over-generalization, which is the source of most errors in rule-based methods. In this situation, the default tag generated from the rule-based system should not be relied upon. Rather, according to one embodiment, the tag generated from the statistical system is utilized as the final POS tag.

Another situation is referred to as a tag disagreement situation in which the rule-based system found a suitable rule to apply to the input context and returned a valid assessment, but the statistical system returned a different tag (even after a tag conversion). In this situation, according to one embodiment, a confidence score of the rule associated with the tag generated by the rule-based system is utilized to evaluate whether the rule-based tag can be selected as the final tag applied to the input context.

According to one embodiment, during development, a confidence score is calculated by confidence score calculator 114 for each rule in the rule-based system based on the histogram data 115 collected over time. Specifically, all such disagreements observed are collected on some suitable development data (typically a relatively small application-specific training collection comparable to, but distinct from, the one used to establish the rules). For each rule r, the instances are tabulated where it was right and wrong, and the confidence score may be calculated as follows according to one embodiment:

$$c_r = \frac{n_{r,i}}{n_{r,i} + n_{r,i}},$$

where $n_{r,i}$ and $n_{r,j}$ denote the number of times the rule r was observed to be right and wrong, respectively. Thus, confidence score $c_r$ represents the successful rate of applying a particular rule in a particular application. According to one embodiment, the rules may be ranked or sorted based on their respective confidence scores.

According to one embodiment, comparing with the statistical assessment, any rule with a confidence score that is below a predetermined threshold, such as, for example, 50%, may be considered as unreliable; otherwise, the rule may be considered as reliable. In one embodiment, a tag generated by rule-based tagger 107 may be selected as the final POS tag if its corresponding confidence score is greater than a predetermined threshold; otherwise, a tag generated by statistical tagger 107 may be selected as the final POS tag. In a particular embodiment, the predetermined threshold is 0.5.

Optionally, according to another embodiment, information concerning the selection of final POS tag may be fed back to the scoring mechanism such as score calculator 114 and/or histogram data 115 of rule-based tagger 107 to adjust the corresponding rule confidence score for subsequent reference. The confidence scores for the rules may be adjusted over time and a rule having a low confidence score may be removed from rule database 113. As a result, rule database 113 can be maintained in a relatively small size. Similarly, such information may also be fed back to the statistical tagger 106 to adjust the related parameters (e.g., CRF parameters) for training purposes. Note that these operations may be performed either manually (e.g., via user inputs), automatically (e.g., data driven via machine learning), or a combination thereof.

According to another embodiment, similar to rule-based tagger 107, confidence score calculator 110 of statistical tagger 106 is also configured to calculate a confidence score for each member of training corpus 109 based on histogram data 111. Similar to a rule-based confidence score, a confidence score for a member of training corpus 109 may be determined as follows:

$$c_s = \frac{n_{s,i}}{n_{s,i} + n_{s,j}},$$

where $n_{s,i}$ and $n_{s,j}$ denote the number of times a particular member of the corpus was observed to be right and wrong, respectively. Thus, confidence score $c_s$ also represents a successful rate of applying a particular member in POS tagging.

According to one embodiment, confidence scores of tags generated by rule-based tagger 107 and statistical tagger 106 may be compared. Based on the comparison, a tag having a higher confidence score may be selected as the final POS tag. In one embodiment, the comparison may be performed only when the rule-based confidence score is less than a predetermined threshold. That is, when the rule-based confidence score is less than the predetermined threshold, the confidence score of the statistical tag may also be evaluated in view of the rule-based confidence score by comparing the confidence scores of the rule-based tag and statistical tag. A tag having a higher confidence score may be selected as the final POS tag. For example, when the rule-based confidence score is less than 0.5, there could be a situation in which the statistical confidence score may be worst (e.g., 0.3). In this situation, the rule-based tag may be a better candidate as the final POS tag, even if the corresponding confidence score were less than 0.5.

Note that some or all of the components as shown in FIG. 1 may be implemented in software, hardware, or a combination of both. For example, system 100 may be implemented as part of an operating system stored and/or executed in a machine readable storage medium (e.g., memory) by a processor of a data processing system. In addition, the confidence score calculator and/or histogram data of any one or both of the statistical tagger 106 and rule-based tagger 107 may be maintained by text analysis unit 102. Alternatively, statistical tagger 106 and/or rule-based tagger 107 may be integrated with text analysis unit 102. Statistical tagger 106 and/or rule-based tagger 107 may be provided by a third party and they may be invoked by text analysis unit 102 via an application programmable interface (API) or over a network. Other configurations may exist.

Figure 2:
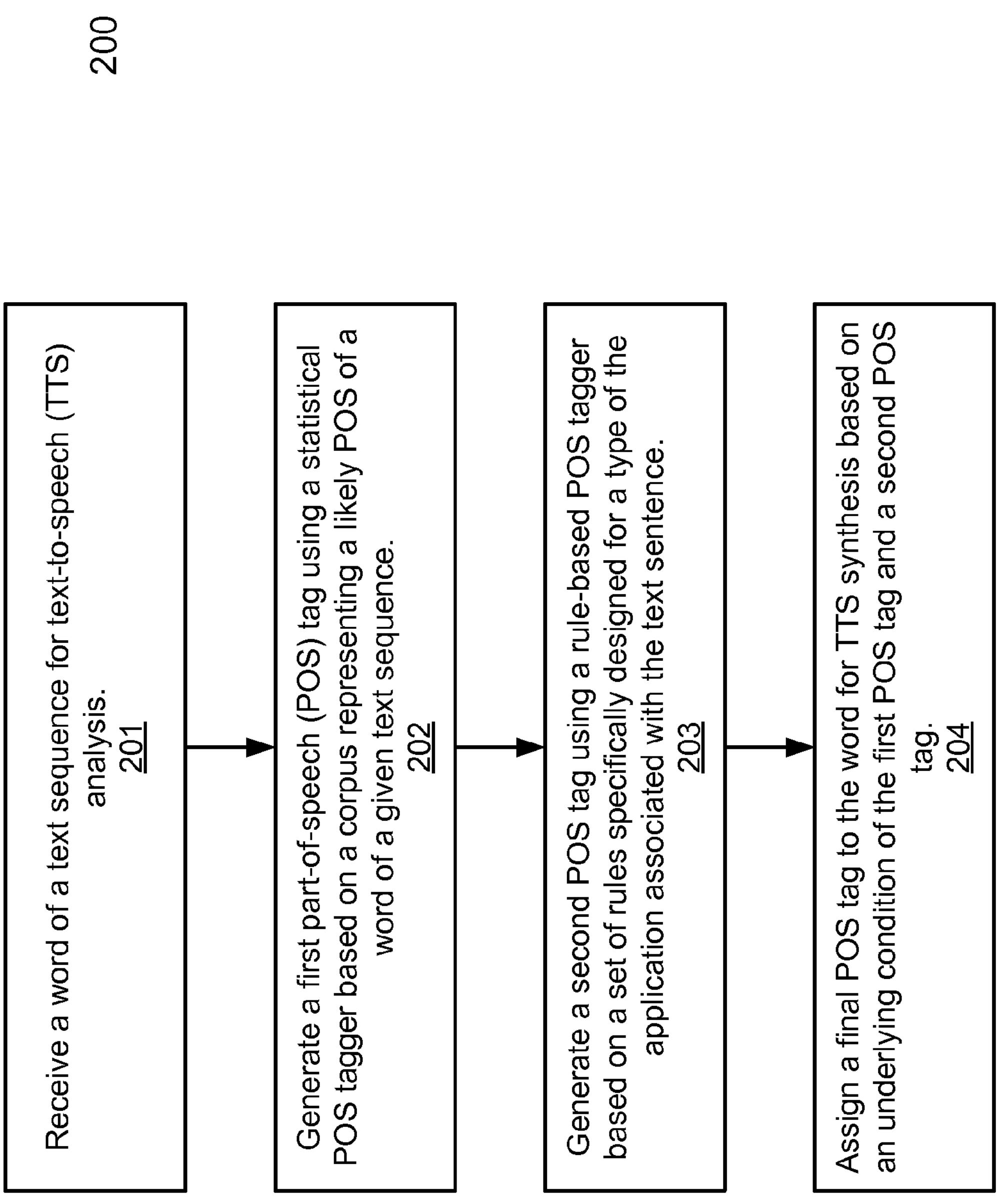
FIG. 2 is a flow diagram illustrating a method for POS tagging in synthesis TTS according to one embodiment of the invention.

FIG. 2 is a flow diagram illustrating a method for POS tagging in synthesis TTS according to one embodiment of the invention. For example, method 200 may be performed by system 100 of FIG. 1. Referring to FIG. 2, at block 201, an input having a word of a text sequence is received for TTS analysis. At block 202, a first POS tag is generated using a statistical POS tagger based on a corpus of trained text sequences representing a likely POS for a word of a given text sequence. At block 203, a second POS tag is generated using a rule-based POS tagger based on a set of rules specifically designed for a type of an application associated with the text sequence. At block 204, a final POS tag is assigned to the word of the text sequence for TTS analysis based on an underlying condition of the first POS tag and the second POS tag.

Figure 3:
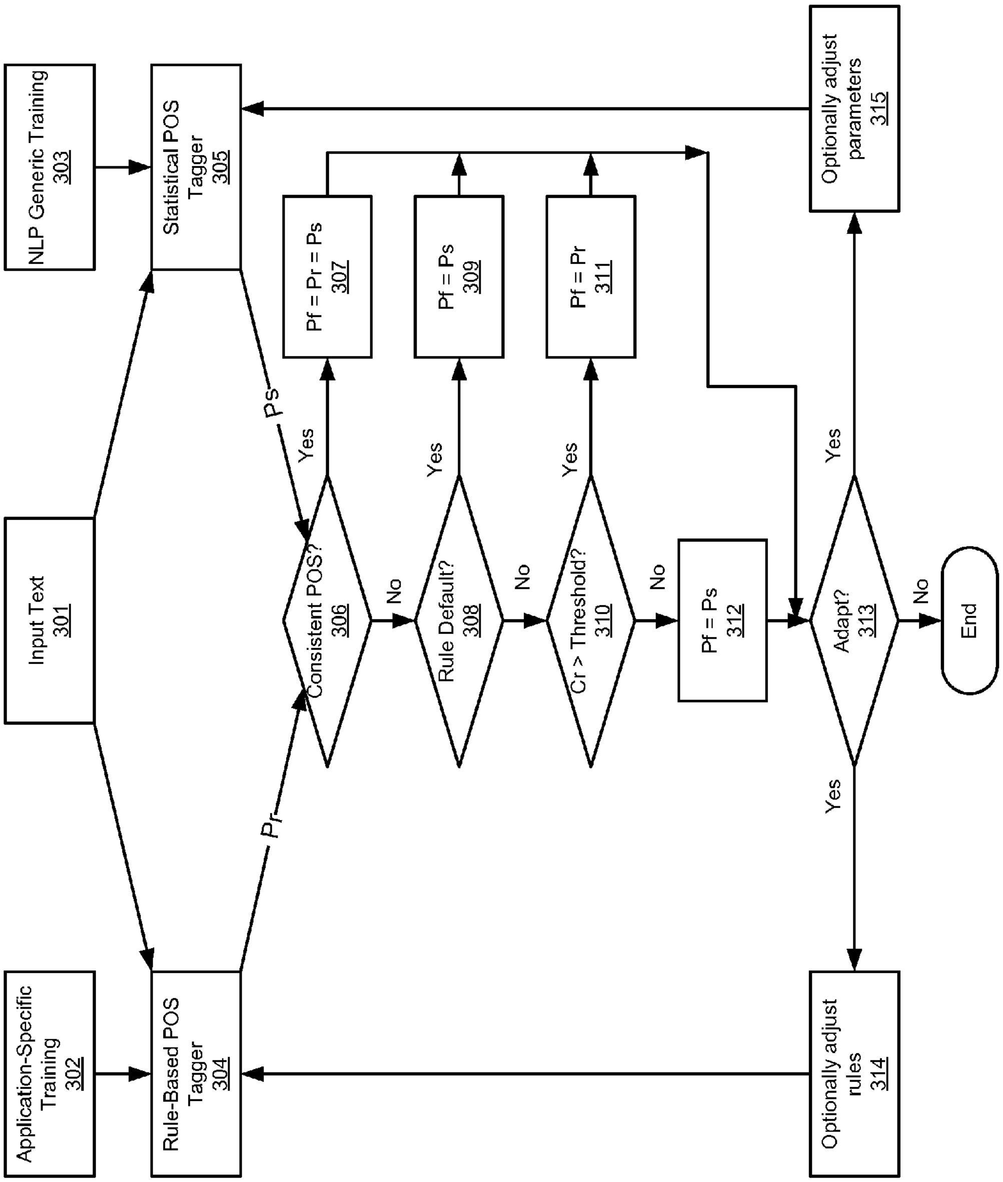
FIG. 3 is a flow diagram illustrating a method for POS tagging in synthesis TTS according to another embodiment of the invention.

FIG. 3 is a flow diagram illustrating a method for POS tagging in synthesis TTS according to another embodiment of the invention. Process 300 may be performed by system 100 of FIG. 1. Referring to FIG. 3, a word of text sequence 301 is input to rule-based POS tagger 304 and statistical tagger 305 independently and/or concurrently. A rule-based POS tag is generated by rule-based POS tagger 304 based on a set of rules that have been generated via application-specific training 302. Similarly, a statistical POS tag is generated by statistical POS tagger 305 based on a corpus that has been generated via NLP generic training 303. At block 306, the rule-based POS tag and the statistical POS tag are compared. If they are identical, at block 307, either one of them is selected as a final POS tag to be assigned to the input word. At block 308, if there is no rule found by rule-based POS tagger 304, the statistical POS tag is selected as the final POS tag; otherwise, the confidence score of the rule-based POS tag is examined at block 310. If the confidence score of the rule-based POS tag is greater than a predetermined threshold such as 0.5, at block 311, the rule-based POS tag is selected as the final POS tag. Otherwise, at block 312, statistical POS tag is selected as the final POS tag. Alternatively, the confidence scores of the rule-based tag and statistical tag are compared to determine which one should be selected as the final POS tag. The tag that has a higher confidence score may be selected as the final POS tag.

In addition, at block 313, it is determined whether the result of the current process should be adapted by the system. If so, optionally, at block 314, the associated rule or rules are adjusted which are fed back to rule-based POS tagger 304. Similarly, associated parameters of statistical tagger 305 may also be adjusted. For example, based on the current result, the confidence scores of the corresponding rule(s) of rule-based POS tagger 304 and the corresponding member(s) of the training corpus of statistical POS tagger 305 may be adjusted. Further, a rule having a significantly low (based on a predetermined threshold) confidence score may be removed from the rule database of rule-based POS tagger 304.

Figure 4:
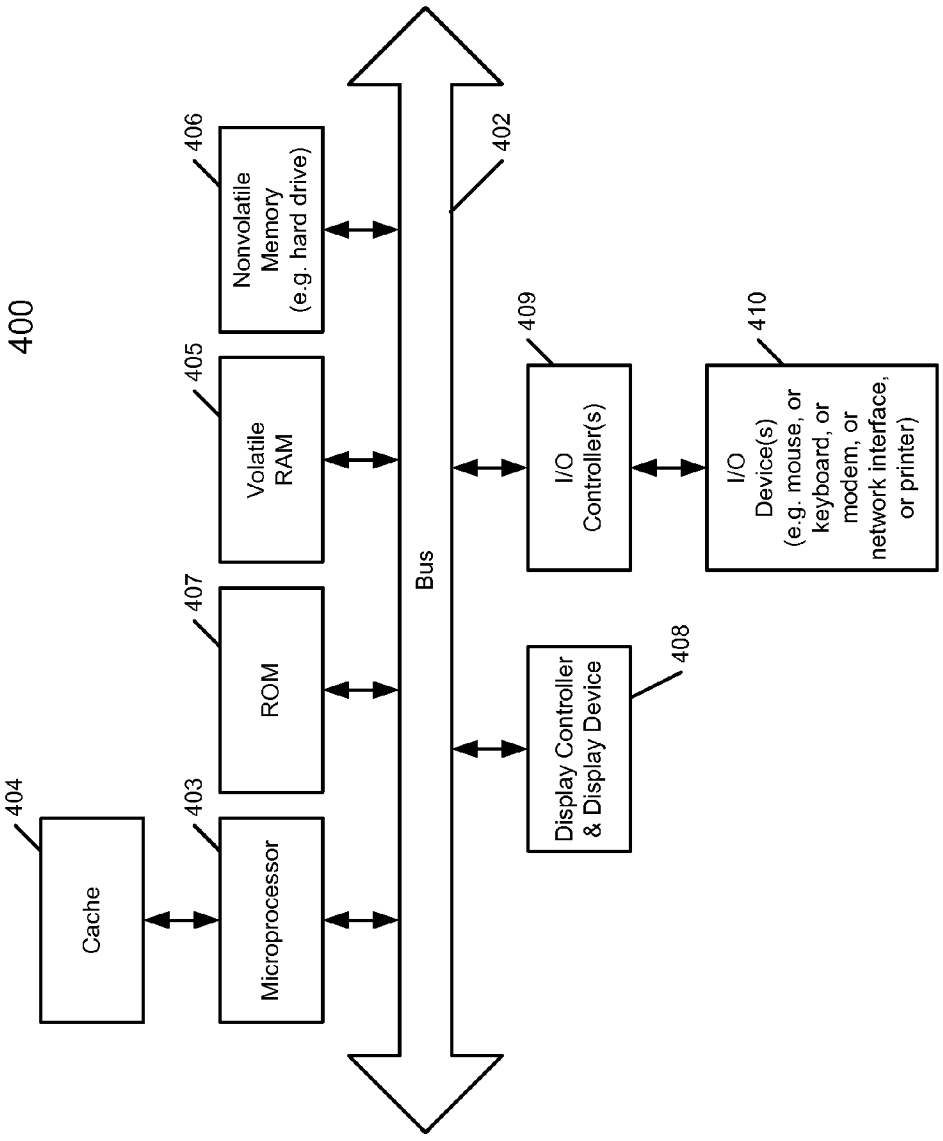
FIG. 4 is a block diagram of a data processing system, which may be used with one embodiment of the invention.

FIG. 4 is a block diagram of a data processing system, which may be used with one embodiment of the invention. For example, the system 400 shown in FIG. 4 may be used as system 100 of FIG. 1. Note that while FIG. 4 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 4 may, for example, be an Apple Macintosh computer or MacBook, or an IBM compatible PC.

As shown in FIG. 4, the computer system 400, which is a form of a data processing system, includes a bus or interconnect 402 which is coupled to one or more microprocessors 403 and a ROM 407, a volatile RAM 405, and a non-volatile memory 406. The microprocessor 403 is coupled to cache memory 404. The bus 402 interconnects these various components together and also interconnects these components 403, 407, 405, and 406 to a display controller and display device 408, as well as to input/output (I/O) devices 410, which may be mice, keyboards, modems, network interfaces, printers, and other devices which are well-known in the art.

Typically, the input/output devices 410 are coupled to the system through input/output controllers 409. The volatile RAM 405 is typically implemented as dynamic RAM (DRAM) which requires power continuously in order to refresh or maintain the data in the memory. The non-volatile memory 406 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 4 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 402 may include one or more buses connected to each other through various bridges, controllers, and/or adapters, as is well-known in the art. In one embodiment, the I/O controller 409 includes a USB (Universal Serial Bus) adapter for controlling USB peripherals. Alternatively, I/O controller 409 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for text-to-speech (TTS) synthesis, comprising:

in response to a word of a text sequence, generating a first part-of-speech POS tag using a statistical POS tagger based on a corpus of trained text sequences, each representing a likely POS of a word for a given text sequence, wherein the first POS tag is selected from a first POS tag set;

generating a second POS tag using a rule-based POS tagger based on a set of one or more rules associated with a type of an application associated with the text sequence, wherein the second POS tag is selected from a second POS tag set that is different from the first POS tag set;

calculating a first confidence score for the second POS tag based on a statistic data of applying a rule associated with the second POS tag, wherein the first confidence score is calculated based on a percentage of successful applications of the rule in previous TTS synthesis;

designating the second POS tag as the final POS tag if the first confidence score is greater than or equal to a first predetermined threshold;

designating the first POS tag as the final POS tag if the first confidence score is less than the first predetermined threshold;

assigning a final POS tag to the word of the text sequence for TTS synthesis based on the first POS tag and the second POS tag;

adjusting the first confidence score for the rule for future TTS synthesis based on whether the second POS tag has been selected as the final POS tag; and removing the rule from the set of one or more rules if the first confidence score is below a second predetermined threshold.

2. The method of claim 1, wherein assigning a final POS tag comprises assigning either the first POS tag or the second POS tag as the final POS tag if the first POS tag and the second POS tag are identical.

3. The method of claim 1, wherein assigning a final POS tag comprises assigning the first POS tag as the final POS tag if the set of one or more rules do not contain a suitable rule corresponding to the text sequence.

4. The method of claim 1, further comprising:

calculating a second confidence score for the first POS tag based on a successful rate of application of the first POS tag using the statistical POS tagger;

designating the second POS tag as the final POS tag if the first confidence score is greater than or equal to the second confidence score; and designating the first POS tag as the final POS tag if the first confidence score is less than the second confidence score.

5. The method of claim 4, further comprising adjusting one or more parameters of the statistical POS tagger for future usage based on whether the first POS tag has been selected as the final POS tag.

6. A non-transitory machine-readable storage medium having instructions stored therein, which when executed by a machine, cause the machine to perform a method for text-to-speech (TTS) synthesis, the method comprising:

in response to a word of a text sequence, generating a first part-of-speech (POS) tag using a statistical POS tagger based on a corpus of trained text sequences, each representing a likely POS of a word for a given text sequence, wherein the first POS tag is selected from a first POS tag set;

generating a second POS tag using a rule-based POS tagger based on a set of one or more rules associated with a type of an application associated with the text sequence, wherein the second POS tag is selected from a second POS tag set that is different from the first POS tag set;

calculating a first confidence score for the second POS tag based on a statistic data of applying a rule associated with the second POS tag, wherein the first confidence score is calculated based on a percentage or successful applications of the rule in previous TTS synthesis;

designating the second POS tag as the final POS tag if the first confidence score is greater than or equal to a first predetermined threshold;

designating the first POS tag as the final POS tag if the first confidence score is less than the first predetermined threshold;

assigning a final POS tag to the word of the text sequence for TTS synthesis based on the first POS tag and the second POS tag;

adjusting the first confidence score for the rule for future TTS synthesis based on whether the second POS tag has been selected as the final POS tag; and removing the rule from the set of one or more rules if the first confidence score is below a second predetermined threshold.

7. The machine-readable storage medium of claim 6, wherein assigning a final POS tag comprises assigning either the first POS tag or the second POS tag as the final POS tag if the first POS tag and the second POS tag are identical.

8. The machine-readable storage medium of claim 6, wherein assigning a final POS tag comprises assigning the first POS tag as the final POS tag if the set of one or more rules do not contain a suitable rule corresponding to the text sequence.

9. The machine-readable storage medium of claim 6, wherein the method further comprises:

calculating a second confidence score for the first POS tag based on a successful rate of application of the first POS tag using the statistical POS tagger;

designating the second POS tag as the final POS tag if the first confidence score is greater than or equal to the second confidence score; and designating the first POS tag as the final POS tag if the first confidence score is less than the second confidence score.

10. The machine-readable storage medium of claim 9, wherein the method further comprises adjusting one or more parameters of the statistical POS tagger for future usage based on whether the first POS tag has been selected as the final POS tag.

11. A computer-implemented method for text-to-speech (TTS) synthesis, the method comprising:

in response to a word of a text sequence, generating a first part-of-speech (POS) tag using a statistical POS tagger based on a corpus of trained text sequences, each representing a likely POS of a word for a given text sequence, wherein the first POS tag is selected from a first POS tag set;

generating a second POS tag using a rule-based POS tagger based on a set of one or more rules associated with a type of an application associated with the text sequence, wherein the second POS tag is selected from a second POS tag set that is different from the first POS tag set;

converting the second POS tag to a corresponding tag in the first POS tag set; and assigning a final POS tag to the word of the text sequence for TTS synthesis based on the first POS tag and the second POS tag.

12. The method of claim 11, wherein converting the second POS tag includes using a table that translates tags between the first POS tag set and the second POS tag set.

13. A computer-implemented method for text-to-speech (TTS) synthesis, the method comprising:

in response to a word of a text sequence, generating a first part-of-speech (POS) tag using a statistical POS tagger based on a corpus of trained text sequences, each representing a likely POS of a word for a given text sequence, wherein the first POS tag is selected from a first POS tag set;

generating a second POS tag using a rule-based POS tagger based on a set of one or more rules associated with a type of an application associated with the text sequence, wherein the second POS tag is selected from a second POS tag set that is different from the first POS tag set;

converting the first POS tag to a corresponding tag in the second POS tag set; and assigning a final POS tag to the word of the text sequence for TTS synthesis based on the first POS tag and the second POS tag.

14. A computer-implemented method for text-to-speech (TTS) synthesis, the method comprising:

in response to a word of a text sequence, generating a first part-of-speech (POS) tag using a statistical POS tagger;

generating a second POS tag using a rule-based POS tagger;

calculating a confidence score for the second POS tag based on a statistic data of applying a rule associated with the second POS tag, assigning a final POS tag to the word of the text sequence for TTS synthesis, including:

assigning the second POS tag as the final POS tag if the confidence score is greater than or equal to a first predetermined threshold; and assigning the first POS tag as the final POS tag if the confidence score is less than the first predetermined threshold;

adjusting the confidence score for the rule for future TTS synthesis based on whether the second POS tag has been selected as the final POS tag; and removing the rule from the set of one or more rules if the confidence score is below a second predetermined threshold.

15. The method of claim 14, wherein the confidence score is calculated based on a percentage of successful applications of the rule in previous TTS synthesis.

16. The method of claim 14, wherein the first POS tag is selected from a first POS tag set, and wherein the second POS tag is selected from a second POS tag set that is different from the first POS tag set.

17. A system, comprising:

one or more processors; and memory having instructions stored thereon, the instructions, when executed by the one or more processors, cause the processors to perform operations comprising:

in response to a word of a text sequence, generating a first part-of-speech (POS) tag using a statistical POS tagger;

generating a second POS tag using a rule-based POS tagger;

calculating a confidence score for the second POS tag based on a statistic data of applying a rule associated with the second POS tag;

assigning a final POS tag to the word of the text sequence for TTS synthesis, including:

assigning the second POS tag as the final POS tag if the confidence score is greater than or equal to a first predetermined threshold; and assigning the first POS tag as the final POS tag if the confidence score is less than the first predetermined threshold;

adjusting the confidence score for the rule for future TTS synthesis based on whether the second POS tag has been selected as the final POS tag; and removing the rule from the set of one or more rules if the confidence score is below a second predetermined threshold.

* * * * *